United States Patent
Toms et al.

(10) Patent No.: US 9,405,026 B2
(45) Date of Patent: Aug. 2, 2016

(54) ESTIMATION OF PRODUCTION SWEEP EFFICIENCY UTILIZING GEOPHYSICAL DATA

(75) Inventors: Julianna J. Toms, Houston, TX (US); Christine E. Krohn, Houston, TX (US); Enru Liu, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 855 days.

(21) Appl. No.: 13/610,530

(22) Filed: Sep. 11, 2012

(65) Prior Publication Data

US 2013/0146282 A1    Jun. 13, 2013

(51) Int. Cl.
G06G 7/48 (2006.01)
G01V 1/30 (2006.01)

(52) U.S. Cl.
CPC .......... *G01V 1/306* (2013.01); *G01V 2210/624* (2013.01)

(58) Field of Classification Search
CPC .................................................. G01V 10/624
See application file for complete search history.

(56) References Cited

U.S. PATENT DOCUMENTS

| | | | | |
|---|---|---|---|---|
| 5,440,525 A * | 8/1995 | Dey-Sarkar | .............. | G01V 1/30 367/21 |
| 5,486,764 A * | 1/1996 | Thompson | ............. | G01V 3/265 324/323 |
| 5,659,135 A | 8/1997 | Cacas | | |
| 5,671,136 A * | 9/1997 | Willhoit, Jr. | ............. | G01V 1/30 702/18 |
| 5,675,147 A | 10/1997 | Ekstrom et al. | | |
| 5,828,981 A | 10/1998 | Callender et al. | | |
| 5,869,755 A | 2/1999 | Ramamoorthy et al. | | |
| 6,088,656 A | 7/2000 | Ramakrishnan et al. | | |
| 6,718,266 B1 * | 4/2004 | Sinha | ....................... | G01V 1/48 367/75 |
| 6,795,773 B2 | 9/2004 | Soliman et al. | | |
| 6,904,365 B2 | 6/2005 | Bratton et al. | | |
| 6,954,402 B2 * | 10/2005 | Brygynevych | ........... | G01V 1/40 367/25 |
| 6,959,246 B2 | 10/2005 | Herron | | |
| 6,987,385 B2 | 1/2006 | Akkurt et al. | | |
| 7,111,681 B2 | 9/2006 | Detournay et al. | | |

(Continued)

FOREIGN PATENT DOCUMENTS

| | | |
|---|---|---|
| WO | WO 2008/083471 | 7/2008 |
| WO | WO 2009/126375 | 10/2009 |

OTHER PUBLICATIONS

Adams, L. et al. (2006), "Gassman's fluid substitution and shear modulus variability in carbonates at laboratory seismic and ultrasonic frequencies," *Geophysics* 71, pp. F173-F183.

(Continued)

*Primary Examiner* — Saif Alhija
(74) *Attorney, Agent, or Firm* — ExxonMobil Upstream Research Co., Law Dept.

(57) ABSTRACT

Method for estimating fluid heterogeneity in a subsurface region from seismic wave attenuation or velocity dispersion that is either measured or extracted from geophysical data (210). A rock physics model in the form of a mathematical relationship is selected that relates attenuation or velocity to frequency and to physical properties that are related to fluid heterogeneity (220). The model, or asymptotes (230) representing the model's behavior at frequency extremes, is inverted (240) and that relationship is used to obtain (250) one or more of the physical properties related to fluid heterogeneity, such as characteristic length scale for fluid saturation heterogeneities (270) and relative volume fractions of the fluids saturating the pore space (280).

29 Claims, 11 Drawing Sheets

(56) References Cited

U.S. PATENT DOCUMENTS

| | | | |
|---|---|---|---|
| 7,136,757 | B2 | 11/2006 | Goloshubin et al. |
| 7,149,671 | B2 | 12/2006 | Lim et al. |
| 7,377,318 | B2 | 5/2008 | Detournay et al. |
| 7,424,367 | B2 | 9/2008 | Saltzer et al. |
| 2006/0153005 | A1 | 7/2006 | Herwanger et al. |
| 2006/0219402 | A1 | 10/2006 | Lecampion |
| 2008/0086287 | A1* | 4/2008 | Xu .................... G01V 99/00 703/2 |
| 2008/0120034 | A1 | 5/2008 | Georgi et al. |
| 2008/0165619 | A1 | 7/2008 | Bachrach et al. |
| 2008/0175099 | A1 | 7/2008 | Hawthorn et al. |
| 2010/0188283 | A1* | 7/2010 | Kemkemian .......... G01S 13/953 342/26 B |

OTHER PUBLICATIONS

Baechle, G.T. et al. (2005), "Changes of shear moduli in carbonate rocks: Implications for Gassmann applicability," *The Leading Edge* 24, pp. 507-510.
Toms, J. et al. (2006), "Comparative review of theoretical models for elastic wave attenuation and dispersion in partially saturated rocks," *Soil Dynamics and Earthquake Engineering* 26, pp. 548-565.
Toms, J. et al. (2007), "Seismic attenuation in porous rocks with random patchy saturation," *Geophysical Prospecting* 55, pp. 671-678.
Toms-Stewart, J. (2009), "Statistical characterization of gas patch distributions in partially saturated rocks," *Geophysics* 74, pp. WA51-WA64.
Tserkovnyak, Y. et al. (2002), "Can one hear the shape of a saturation patch," *Geophysical Research Letters* 29, pp. 1108-1112.
Vanario, T. et al. (2008), "Seismic attenuation in porous rocks with random patchy saturation," *The Leading Edge* 55, pp. 1040-1048.
White, J.E. (1975), "Computed eismic speeds and attenuation in rocks with partial gas saturation," *Geophysics* 40, pp. 224-s232.
White, J.E. etal . (1976), Low-frequency seismic waves in fluid-saturated layered rocks, *Physics of the Solid Earth* 1, pp. 6514-659.
Xu, S. et al. (2007), "Carbonate Rock Physics: Analytical Models and Validations Using Computational Approaches and Lab/Log Measurements," *IPTC* No. 11308, *Int'l. Petroleum Tech. Conf*, 10 pgs.
Adams, L. et al. (Nov.-Dec. 2006), Gassman's fluid substitution and shear modulus variability in carbonates at laboratory seismic and ultrasonic frequencies, *Geophysics* 71, pp. Fl 73-F183.
Baechle, G.T. et al. (May 2005), "Changes of shear moduli in carbonate rocks: Implications for Gassmann applicability," *The Leading Edge* 24, pp. 507-5JO.
Berryman, J.G. (Mar. 1995), "Mixture theories for rock properties," *A Handbook of Physical Constants*, T.J. Ahrens ed American Geophysical Union, Washington, D.C., pp. 205-208.
Biot, M.A. (Apr. 1962), "Mechanics of deformation and acoustic propagation in porous media," *J. of Appl. Physics* 33, pp. 1482-1488.
Brie, A. et al. (Oct. 1995), "Shear sonic interpretation in gas bearing sands," SPE 30595, SPE Annual Tech. Conf. & Exh., pp. 701-710.
Cadoret, T. et al.. (Jun. 10, 1995), "Influence of frequency and fluid distribution on elastic wave velocities in partially saturated limestones," *J. of Geophysical Research* 100(B6), pp. 9789-9803.

Cadoret, T. et al. (Jan.-Feb. 1998), "Fluid distribution effect on sonic attenuation in partially saturated limestones," *Geophysics* 63(1), pp. 154-160.
Galvin, R.J., et al. (Sep. 2007)., "A simple approximation for seismic attenuation and dispersion in a fluid- saturated porous rock with aligned fractures," SEG Expanded Abstracts 26, pp. 1679 1683.
Gassmann, F. (Jul. 1951), "Elastic waves through a packing of spheres," *Geophysics* 16, pp. 673-685.
Gist, G.A. (Jul. 1994), "Interpreting laboratory velocity measurements in partially gas-saturated rocks," *Geophysics* 59(7), pp. 1100-1109.
Gurevich, B. et al. (Dec. 1995), "Velocity and attenuation of elastic waves in finely layered porous rocks," *Geophysical J. Int'l.* 121, pp. 933-947.
Hill, R. (Apr. 1963), "Elastic properties of reinforced solids: some theoretical principles," *J. of the Mechanics and Physics of Solids* 11, pp. 357-372.
Johnson, D.L. (Apr. 2001), "Theory of frequency-dependent acoustics in patchy-saturated porous media," *J. of the Acoustical Society of America* 110, pp. 682-694.
Mülller, T.M. et al. (Sep.-Oct. 2004), "One-dimensional random patchy saturation model for velocity and attenuation in porous rocks," *Geophysics* 69(5), pp. 1166-1172.
Mülller, T.M.et al. (May 2008), "Velocity-saturation relation for partially saturated rocks with fractal pore fluid distribution," Geophysical Research Letters 35, L09306, 4 pgs.
Pride, S.R. et al. (Jan. 2004) "Seismic attenuation due to wave-induced flow," J. of Geophysical Research 109, B01201, 19 pgs.
Pride, S.R. (Sep. 2003), "Linear dynamics of double-porosity and dual-permeability materials, 1 Governing equations and acoustic attenuation," Phys. Rev. E. 68, pp. 036603-1-036603-10.
Pride, S.R. (Sep. 2003), "Linear dynamics of double-porosity and dual-permeability materials, II. Fluid transport equations," Phys. Rev. E. 68, pp. 036604-1-036604-10.
Toms, J. et al. (Jan. 2006), "Comparative review of theoretical models for elastic wave attenuation and dispersion in partially saturated rocks," *Soil Dynamics and Earthquake Engineering* 26, pp. 548-565.
Toms, J. et al. (Sep. 2007), "Seismic attenuation in porous rocks with random patchy saturation," *Geophysical Prospecting* 55, pp. 671-678.
Toms-Stewart, J. (Mar.-Apr. 2009), "Statistical characterization of gas patch distributions in partially saturated rocks," *Geophysics* 74, pp. WA51-WA64.
Tserkovnyak, Y. et al. (Apr. 2002), "Can one hear the shape of a saturation patch," *Geophysical Research Letters* 29(7), pp. 1108-1112.
Vanario, T. et al. (Aug. 2008), "The effect pf chemical and physical processes on the acoustic properties of carbonate rocks," *The Leading Edge* 55, pp. 1040-1048.
White, J.E. (Apr. 1975), "Computed seismic speeds and attenuation in rocks with partial gas saturation," *Geophysics* 40, pp. 224-232.
White, J.E. et al (Aug. 1975), Low-frequency seismic waves in fluid-saturated layered rocks, *Physics of the Solid Earth* 1, pp. 6514-659.
Xu, S. et al. (Dec. 2007), "Carbonate Rock Physics: Analytical Models and Validations Using Computational Approaches and Lab/Log Measurements," *IPTC* No. 11308, *Int'l. Petroleum Tech. Conj*, 10 pgs.

* cited by examiner

ESTIMATION OF PRODUCTION SWEEP EFFICIENCY UTILIZING GEOPHYSICAL DATA

CROSS-REFERENCE TO RELATED APPLICATION

This application claims the benefit of U.S. Provisional Patent Application 61/569,576 filed Dec. 12, 2011, entitled ESTIMATION OF PRODUCTION SWEEP EFFICIENCY UTILIZING GEOPHYSICAL DATA, the entirety of which is incorporated by reference herein.

FIELD OF THE INVENTION

This invention relates generally to the field of oil and gas production and, more particularly, to estimating production-induced changes in hydrocarbon fluid saturation and the spatial distribution of the residual hydrocarbons utilizing geophysical information. Specifically, the invention is a method for characterizing saturation heterogeneities in reservoirs (i.e., unproduced pockets of oil or gas) by quantifying and interpreting changes in P-wave velocity and attenuation utilizing rock physics relationships.

BACKGROUND OF THE INVENTION

The objective of the present invention is to use attenuation and velocity dispersion data to determine parameters that describe subsurface fluid distribution. These parameters may include spatial distribution fluids, heterogeneity length scale, and average saturation. Specifically, the invention employs a poroelastic rock physics model (and its frequency behavior or asymptotes) to provide a physics-based interpretation of geophysical parameters. Published work that might be relevant to the invention falls into two classifications. They are either theoretical studies or patents which seek to invert geophysical data into fluid distribution parameters, mainly average saturation. See U.S. Pat. No. 7,136,757 to Goloshubin and Korneev; U.S. Patent Application Publication No. 2008/0175099 by Hawthorne et al.; and Tserkovanyak and Johnson, 2004). There are many theoretical modeling studies that demonstrate aspects of the physical mechanism employed by the invention (see, for example, Johnson 2001; Pride at al. 2004; Toms et al. 2008), but none of these studies present any strategy to interpret the geophysical information for parameters describing the fluid distribution. The present inventors are not aware of any published work aimed at using attenuation to define all three significant aspects of subsurface fluid distribution (spatial distribution, length scale and average saturation).

In U.S. Pat. No. 7,136,757, Goloshubin and Korneev (2006) utilize the reflection characteristics of seismic waves from a target layer and reference layer of known average fluid saturation to determine the average fluid saturation within the target layer. The reference layer is normally decided from the borehole or log data; however other reference layers may be utilized. They perform a low pass filtering of the windowed reflections from the target layer leaving frequencies below the lowest recorded frequency spectra. They define a complex ratio $R(x,\omega)=W(x,\omega)/W(x0,\omega)$ of the low frequency amplitude spectra of the target $W(x,\omega)$ and reference layer $W(x0,\omega)$ data. They determine the average relative reflected amplitude $A(x)$ by summing the ratios $R(x,\omega)$ of the first N reliable low frequency $\omega$. They also analyze the derivative of the average amplitude $D_A(x)$ with respect to frequency and the derivative of the average time delay $D_P(x)$ with respect to frequency. They map the average fluid saturations by utilizing the calibration conditions: $A(x_0)=1$, $D_A(x_0)=0$, and $D_P(x_0)=0$ at the location $x=x_0$. The invention patented by Goloshubin and Korneev estimates only average fluid saturation and fluid type based on attribute (seismic spectral) variation from the calibration conditions. While attenuation and phase velocity dispersion may be implicit in the physics of this invention, in that the reflected amplitude from the target and reference layers will be affected similarly by velocity dispersion, this additional physical knowledge is not exploited to determine the full gamut of subsurface fluid distribution parameters.

In U.S. Patent Application Publication US 2008/0175099, Hawthorne et al. determine fluid type within subsurface formations surrounding a borehole. The invention utilizes sonic logging data, in addition to open-hole log measurements of porosity, lithology etc. They propose three different ways of characterizing fluid type. The first is to determine formation mobility, which is the ratio of rock permeability to fluid viscosity. They propose using the formation mobility to indicate fluid viscosity which differs for heavy oil, oil, gas and water. The second approach considers pore fluid bulk modulus, as the compressibility of heavy oil, water, gas etc is very different. The third approach considers attenuation. The invention utilizes compressional, shear and Stoneley waveforms, where slowness (the inverse of velocity) and attenuation of each waveform may be utilized to invert for pore fluid bulk modulus, borehole mud slowness or formation mobility.

Tserkovank and Johnson (2001) seek to invert geophysical data for heterogeneity length scale information. They utilize the laboratory experimental data acquired by Cadoret et al. (1998). They assumed a respective water saturation, and for each saturation used the corresponding P-wave attenuation and velocity measurements to determine a length scale for the heterogeneity. Their method employs a rock physics model that assumes a fixed fluid distribution pattern described by periodically distributed spherical saturation heterogeneities. The approach described in the Tserkovanayak and Johnson paper employs a straight inversion of attenuation and velocity information to determine length scale, utilizing a rock physics model knowing all other rock and fluid properties, including the average fluid saturation.

SUMMARY OF THE INVENTION

In one embodiment, the invention is computer implemented method for estimating fluid heterogeneity in a subsurface region from compressional wave attenuation or velocity dispersion, comprising: (a) measuring compressional wave attenuation or velocity, or extracting it from geophysical data, for at least one frequency; (b) selecting a frequency-dependent, mathematical rock physics model for attenuation or velocity, said model pertaining to or containing one or more model parameters that pertain to heterogeneous features of fluid distribution in the subsurface region; (c) using the rock physics model to predict frequency dependence of compressional wave attenuation or velocity; and (d) using the predicted frequency dependence, the attenuation or velocity measured or determined from the geophysical data for at least one frequency, and measured or estimated rock and fluid properties of the subsurface region, called subsurface properties, to determine, using a computer, at least one unknown subsurface property, including fluid saturation, that is related to fluid heterogeneity, each such subsurface property corresponding to a parameter in the mathematical rock physics model.

BRIEF DESCRIPTION OF THE DRAWINGS

The present invention and its advantages will be better understood by referring to the following detailed description and the attached drawings in which.

Figure 1:
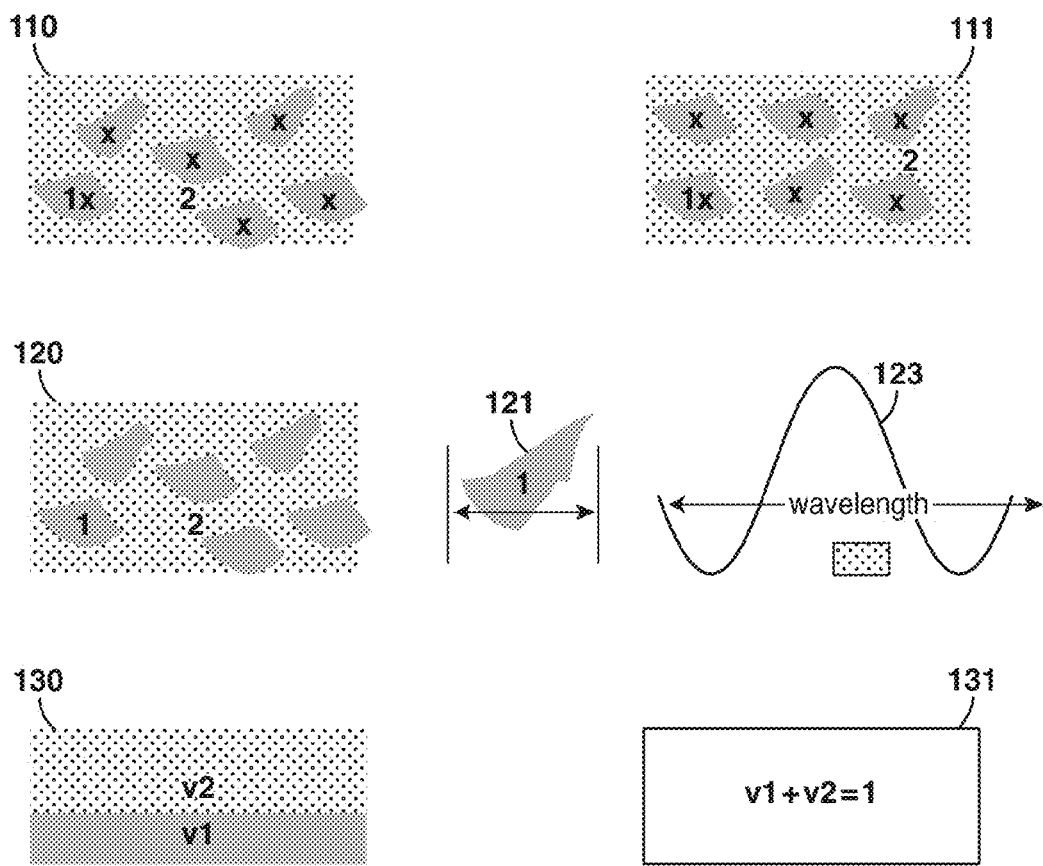
FIG. 1 shows two examples of potential hydrocarbon spatial distribution within an otherwise water-saturated rock.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claim.

DETAILED DESCRIPTION OF EXAMPLE EMBODIMENTS

This invention relates to estimating original or production induced changes in hydrocarbon fluid saturation and the spatial distribution of the residual hydrocarbons utilizing geophysical information. These production measurements may be interpretable by quantifying changes in P-wave velocity and attenuation utilizing rock physics relationships. This invention aims at characterizing saturation heterogeneities in reservoirs that are significantly smaller than the P-wave wavelength, which cannot normally be resolved utilizing standard geophysical methods. Assuming a rock physics model, the expected behavior of attenuation and/or velocity as a function of frequency can be predicted. The model-based predicted behavior along with attenuation and/or velocity measurements at one or more frequencies and assumptions of the reservoir conditions (temperature, pressure) and properties (rock and fluid type, elastic properties, etc.) are used to constrain the type of spatial distribution, length scale of the heterogeneities, or fluid saturation.

The results of the invention can be utilized for refining initial models of reservoir fluid saturation prior to staged production simulation and for refining estimates of hydrocarbon volumes still in place. In the production setting, the results of the invention may also be utilized to diagnose sweep efficiency. That is, whether fluid sweeping across the reservoir is homogeneous or heterogeneous and if heterogeneous at what length scale. The results of the invention may also be used in an exploration setting for hydrocarbon prediction; however there is more uncertainty in this scenario, due to the lack of prior rock property knowledge.

When producing from reservoir rock exhibiting spatial variation in permeability, complexity in wettability or spatial variation in pore topology, a significant volume of hydrocarbon may remain in place. To assist with maximizing recovery, it is beneficial to monitor production induced changes in fluid saturation utilizing geophysical data. The usual approach is to conduct a geophysical survey both prior to production (base survey) and subsequent to production (monitor survey). When survey and data processing repeatability is high, the differences between geophysical data sets may be attributed to alterations in reservoir pressure or fluid saturation. As of yet, such time-lapse, sometimes referred to as 4D, signatures observed in geophysical data are not readily interpretable in a quantitative way or even in a qualitative way for certain reservoir rock types. In part this may be a consequence of not taking into account additional physical effects, which result from the presence of sub-wavelength fluid saturation heterogeneities. Here saturation heterogeneities refer to immiscible (interfacially separated) fluids, which are spatially distributed through out the rock non-uniformly. Sub-wavelength refers to a characteristic length scale of the spatial distribution being less than the wavelength of the seismic compressional wave. The presence of sub-wavelength saturation heterogeneities has been shown experimentally and theoretically to cause P-wave attenuation and velocity dispersion (velocity dispersion refers to the variation of wave speeds with frequency). See, among other references, Cadoret et al. (1995), Cadoret et al. (1998), Johnson (2001), and Müller and Gurevich (2004).

Common Fluid Substitution Practices Utilized in 4D Studies

Crucial for interpreting 4D signatures for changes in fluid saturation is the capacity to model the elastic properties of partially saturated rock. (Partial saturation here means that the rock has at least two pore fluids, typically oil and brine.) Most techniques for interpreting or forward modeling the elastic properties of the fluid saturated rock assume a uniform distribution of fluids and utilize Gassmann's fluid substitution relationship (Gassmann 1951). By knowing the elastic properties of the pore fluid, dry rock and grain that makes up the rock, in addition to the porosity of the rock, Gassmann's relationship can be utilized to calculate the elastic properties of a fully fluid saturated rock. The influence of multiple pore fluids is then addressed by substituting an effective pore fluid with an elastic modulus that is the volumetric average of the elastic moduli of the component pore fluids.

There are three effective pore fluids commonly substituted into Gassmann's relationship for evaluation of 4D signatures. The first approach assumes that pore fluids are uniformly distributed through out the pore space, or that within a half wavelength of the P wave, that fluid pressure is equilibrated. When either of these assumptions is satisfied, the bulk modulus of the effective pore fluid is equal to the harmonic volume average of the elastic moduli of each pore fluid. This effective pore fluid is then utilized within Gassmann's relationship to model the bulk and shear moduli.

The second approach assumes that pore fluid does not equilibrate within a half wave cycle. This is modeled by assuming that the shear modulus of the rock is independent of the elastic properties of the pore fluids. When this assumption is permitted, the bulk modulus of each region of the rock saturated by a different pore fluid is modeled using Gassmann's fluid substitution method. The overall elastic properties of the rock are then modeled assuming Hill's relationship (Hill 1963), which relates the inverse saturated P wave modulus to the harmonic volume average of the saturated P wave modulus of each rock component saturated by a different pore fluid. Commonly the second approach is approximated by utilizing Gassmann's fluid substitution and postulating the presence of an effective pore fluid, which has a bulk modulus equivalent to the arithmetic volume average of the bulk modulus of each pore fluid.

The third approach also postulates the existence of an effective pore fluid, then Gassmann's fluid substitution is utilized to model the elastic properties. The effective pore fluid is modeled assuming Brie's empirical relationship (Brie et al. 1995).

Alternative Fluid Substitution Methodologies for 4D Studies

An alternative fourth approach to modeling the effective elastic properties of a fluid saturated rock is Gassmann-consistent and satisfies both the low and high frequencies limits on the elastic moduli. This allows pore fluids to be distributed throughout the rock in a realistic way, described by a correlation function. To model the elastic moduli, a spatial distribution of the pore fluid must be assumed and also a length scale which describes its spatial distribution. The method is described in Toms et al. (2006). This approach allows the elastic moduli to be modeled when immiscible pore fluids are spatially distributed in a complicated way. That is, pore fluid spatial distribution can be modeled assuming that fluids are spatially distributed according to a correlation function (with an associated correlation length). When approach No, 3 is assumed, wave attenuation can also be calculated.

There are classes of fluid substitution methods that allow additional physical effects of frequency-dependent P-wave attenuation and phase velocity to be modeled for partially saturated rock. These methods are consistent with the low and high frequency limits on the elastic moduli of partially saturated rock, and allow the effects of wave induced fluid flow to be accounted for. These methods do not appear to have been applied in any 4D time lapse studies. The current invention uses the frequency behavior of attenuation and velocity to derive the properties of spatial distribution of heterogeneities in pore fluid.

Attenuation and Velocity Dispersion

Two important characteristics of wave propagation are velocity and attenuation. To date, most geophysical technology utilized to image the subsurface relies fundamentally upon velocity, which is typically assumed to be independent of frequency (i.e. not dispersive). One exception is in the borehole environment where Stoneley wave attenuation is being utilized to estimate permeability. There are two primary reasons why attenuation is currently not exploited. First, a best practice for estimating or measuring attenuation does not exist, and there is still much debate on whether attenuation needs to be measured or whether it can be reliably extracted from the geophysical data via processing. The second reason is that attenuation data are difficult to interpret. Much of this difficulty stems from: (a) not understanding the physical mechanisms responsible for the loss of wave energy and (b) not having access to appropriate rock physics models.

The present invention addresses the second issue. That is, given a set of reliable attenuation and/or velocity dispersion measurements, how could or should they be interpreted? The issue of how attenuation is to be measured or extracted from geophysical data is a separate concern. Nevertheless, there are presently techniques to do this, and it may be expected that these methods will be improved in the future, and that developments in interpretation strategies will act as further motivation. Specifically, the invention interprets attenuation in terms of three parameters significant for characterization of subsurface fluid distribution. They are the fluid spatial distribution, the length scale and the relative percentage of fluids. Hence, implicit within the invention is the assumption that wave attenuation is caused by one physical mechanism due to the presence of two or more fluids.

In general, wave attenuation may be caused by many different physical mechanisms resulting from different characteristics of the rock and/or fluids. That is, wave attenuation may result from the presence of fractures within porous fluid saturated rock (Galvin et al. 2007). It may be the result of heterogeneities in rock porosity and permeability (Pride et al. 2004). It may arise due to the presence of small cracks on the pore scale interacting with pore fluids (Gist 1994). In short, there are many different physical mechanisms which have the potential to cause significant attenuation if the physical context arises. As such, attenuation is diagnostic of specific rock and/or fluid features. All of these mechanisms result in what is called intrinsic attenuation of wave energy. There are of course other reasons why waves suffer attenuation, such as geometrical spreading, mode conversion and reflection (scattering). The latter effects lead to what is termed apparent attenuation, in which there is no energy loss. The invention assumes that apparent attenuation has been separated from intrinsic attenuation. That is, the invention operates on intrinsic attenuation values to estimate characteristics of subsurface fluid distribution.

The Physical Mechanism

When compressional waves encounter two or more fluids within a porous rock, there can be significant attenuation and dispersion of the propagating waveform. This occurs because pressure gradients are induced between regions of the rock saturated by different fluids. The pressure gradients cause fluid flow relative to the rock frame, which leads to the viscous dissipation of wave energy. Thus, work is being done by the compressional wave on the fluids within the porous rock, and consequently the energy of the acoustic wave is correspondingly reduced. In simple analogous terms, one could imagine compressing a sponge partially saturated by water. The compression of the sponge causes water to spread to other regions of the sponge previously unsaturated. It is this kind of fluid movement relative to the framework of the sponge or rock, which leads to the loss of wave energy.

As a compressional wave cycles between compression and rarefaction, pressure gradients are induced in opposing directions through out the rock in accordance with the wave frequency. Fluid pressure equilibration will occur only for low enough wave frequencies when the characteristic length scale of the fluid heterogeneities is smaller than the fluid pressure diffusion length (Norris, 1993). The diffusion length scale is defined by $$\lambda_d = \sqrt{\frac{\kappa N}{\omega \eta}},$$

where $\kappa$ is rock permeability, $\eta$ is fluid viscosity, $\omega$ is the angular wave frequency and N is a combination of poroelastic moduli. When fluid pressure equilibrates, it is analogous to having a homogeneous saturation of fluid. On the other hand, when wave frequencies are sufficiently high (or the heterogeneity length scale is greater than the diffusion length, there is not sufficient time for fluid pressure equilibration to occur. Hence, there are individual patches through out the rock having constant but different fluid pressures. It is at intermediate wave frequencies or heterogeneity length scales where wave attenuation and velocity dispersion may be significant.

The practical implication of this physical mechanism is that compressional waves of any frequency may be affected by attenuation and velocity dispersion. That is, it is not necessarily the case that fluid pressure will be equilibrated during seismic frequencies as the heterogeneity length scale needs to be smaller than the diffusion length. One clear example is the influence of shallow gas (or gas chimneys) on seismic surveys, where significant losses in compressional wave energy have been observed in geophysical data.

Experimental Observation of Saturation Heterogeneities and Associated Effects

Fundamental to understanding compressional wave propagation through partially fluid saturated rock is the need to consider fluid distribution, in particular its heterogeneity length scale. It is the heterogeneity length scale relative to the diffusion length of the rock which influences the peak frequency of attenuation. Cadoret et al. (1990) showed experimentally that saturation heterogeneities greater than the diffusion length may cause significant attenuation and velocity dispersion of ultrasonic waves. In a series of experiments, the fluid distribution of a carbonate rock undergoing changes in water saturation was observed utilizing X-ray tomographic imaging; acoustic measurements were taken concurrently. The images show that different fluid saturation processes result in different fluid distributions for the same average water saturation. The acoustic measurements indicate the velocity and attenuation at certain water saturations is influenced by the fluid distribution pattern. While the images acquired during the experiment indicate fluid spatial distribution, only qualitative measures were utilized to infer that the heterogeneity length scale was greater than the diffusion length.

Toms et al. (2009) analyzed a series of X-ray tomographic images of partially water and gas saturated limestone undergoing changes in saturation. Statistical methods were utilized to characterize changes in the spatial distribution of fluids as water saturation was altered. The statistical measures varied significantly for small incremental increases in gas saturation at larger water saturation. When gas saturation was large, the statistical measure characterizing pore fluid spatial correlation did not change significantly, but only the characteristic length scale altered. By applying a specific method of fluid substitution, a technique was presented to forward model wave attenuation and velocity dispersion for the true fluid distribution patterns as shown in X-ray tomographic images. Hence, this shows directly that the spatial distribution (and its characteristic length scale) of fluid heterogneities may impact wave attenuation and velocity dispersion as water saturation is altered.

Frequency Dependent Attenuation Asymptotes

From a mathematical standpoint, an asymptote is a linear function that stands in a specific relationship to another function, such that the distance between the asymptote and the function approaches zero as they tend to infinity. Frequency dependent asymptotic behavior of attenuation is speculated to be linked to the spatial distribution of rock and fluid heterogeneities. For example, as wave frequency approaches zero an oblique frequency asymptote describes the low-frequency dependent behavior of attenuation. Similarly as wave frequency approaches infinity another oblique frequency asymptote describes the high-frequency attenuation. The zero and infinite frequency asymptotes represent two different physical scenarios. They represent the limit when fluid pressure is relaxed (i.e. the same fluid pressures through out the rock) and when fluid pressure is unrelaxed (different fluid pressures through out the rock). The peak frequency of attenuation occurs at the intersection frequency of the asymptotes, this is the frequency at which attenuation reaches a maximum. The specific intersection frequency depends on rock permeability and heterogeneity length scale. Gurevich and Lopatnikov (1995) show that the obliqueness of the attenuation asymptotes depends on the type of spatial variation of heterogeneities.

This invention employs a model-based predicted frequency behavior such as an asymptote to determine subsurface fluid distribution. It is believed that the significance of attenuation asymptotes or the frequency behavior at high and low frequencies has not been widely known and appreciated, and that there are no published reports that utilize attenuation asymptotes to determine rock and/or fluid distribution characteristics.

The present invention aims at identifying three aspects of subsurface fluid saturation utilizing geophysical data. The first objective of the invention is to determine the fluid spatial distribution. That is, whether fluid spatial distribution is homogeneous or heterogeneous. For the case where pore fluid distribution is heterogeneous, the invention seeks to identify potential spatial patterns. FIG. 1 shows two examples of potential hydrocarbon spatial distribution within an otherwise water saturated rock: 110 a random distribution of hydrocarbon patches (denoted by the symbol x) and 111 a periodic distribution of hydrocarbon patches. Alternatively (not shown), a periodic spatial distribution might be regularly distributed layers, and a random spatial distribution might be randomly distributed layers. In any case, the spatial distribution may or may not be described by, for example, a correlation function or a linear path function.

The second objective of the invention is to identify the size of sub-wavelength saturation heterogeneities. 120 shows a spatial distribution of hydrocarbon patches in an otherwise water saturated porous rock. 121 shows the characteristic length of the hydrocarbon patches. 122 shows that the characteristic length of the hydrocarbon heterogeneities is much less than the P wavelength 123 of the geophysical data. The third objective of the invention is to identify the relative percentage of saturating fluids, that is, how much water or hydrocarbon is present. 130 shows the relative saturation of two different fluids, given by volume fractions $v_1$, $v_2$. 131 shows that the porosity of the rock is fully fluid saturated by two different fluids of volume fractions $v_1$, $v_2$.

The invention employs physical relationships which relate spatial distribution, patch size and percent saturation to P wave attenuation and velocity dispersion. Hence, when P wave attenuation and dispersion is negligible, the invention cannot be employed to estimate subsurface fluid distribution parameters.

Figure 2:
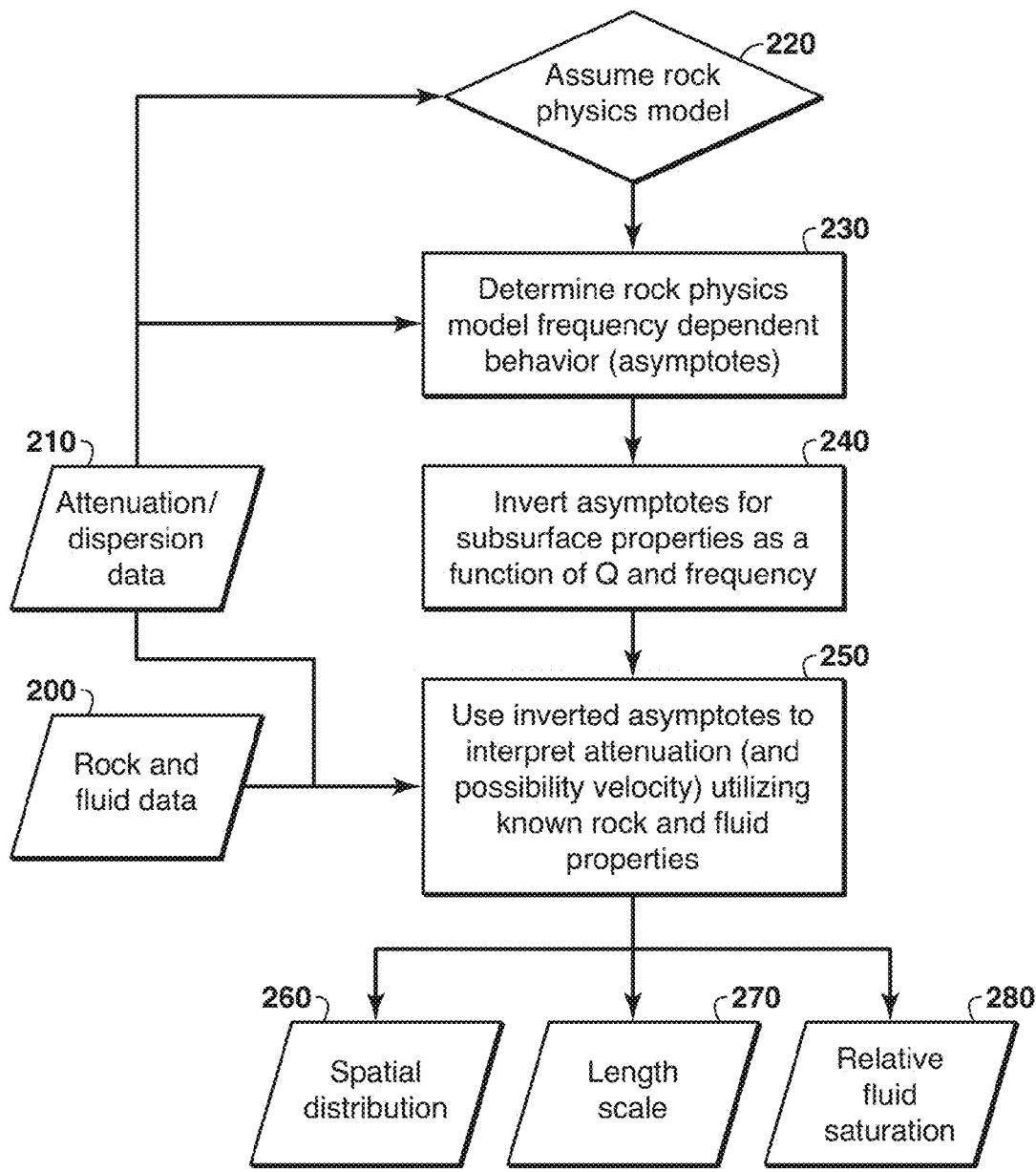
FIG. 2 is a flowchart showing basic steps in one embodiment of the invention.
Figure 3A:
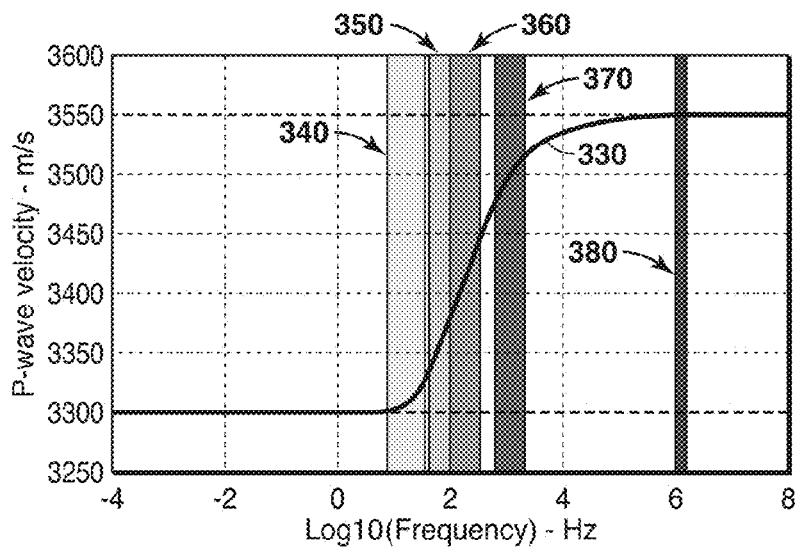
FIGS. 3A-3C show P-wave velocity dispersion for rocks of different permeability.
Figure 3B:
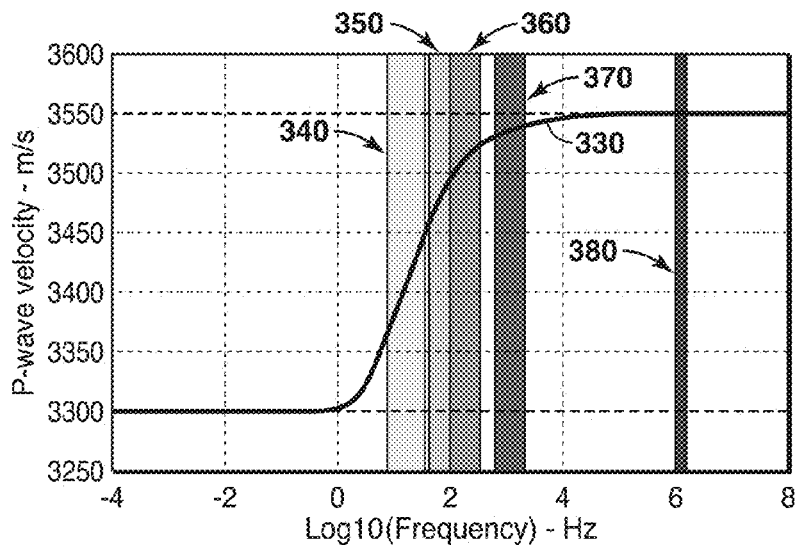
Figure 3C:
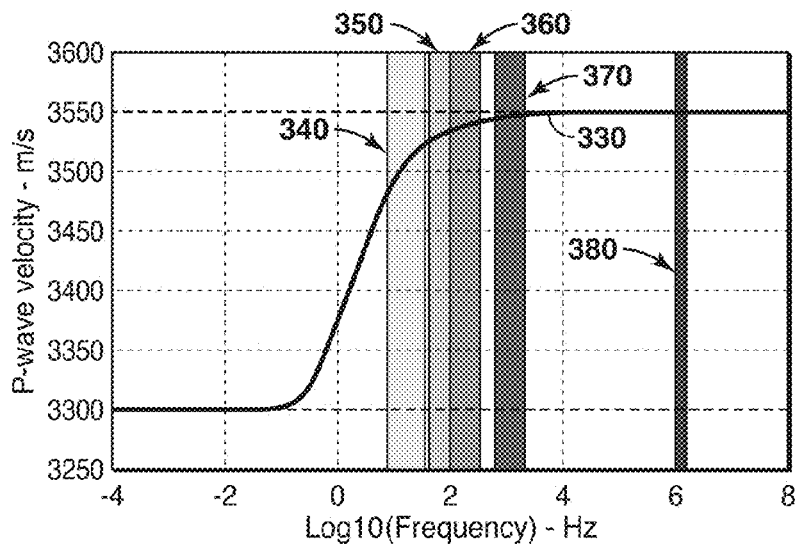

A flow chart showing basic steps in one embodiment of the invention is shown in FIG. 2. The invention operates on attenuation and/or velocity dispersion data 210 that have been either measured directly using instruments or have been estimated using processing techniques from geophysical data. The invention can operate on attenuation and velocity data obtained from any type of geophysical data, such as seismic, cross well tomography, VSP, sonic logs, laboratory measurements on core plugs or from utilizing any combination of the above listed data types.

The geophysical data types span a large frequency range up to hundreds of Hz for seismic to 1 kHz for logging to 1 MHz for laboratory measurements. Presumably, the processing methods for converting geophysical data into attenuation and velocity dispersion information will be different from data type to data type. The reason for this is that the data types have very different frequency bandwidth, different acquisition geometries, different wavefield characteristics (transmission versus reflection) and different sized volumetric regions impacting wave propagation. Common to all the data processing methods and measuring techniques applied to the geophysical data is the need to obtain attenuation and velocity data with respect to wave frequency. That is, it is necessary to have reliable attenuation/velocity values and frequency values. Furthermore, data processing methods that assume specific frequency dependent attenuation behavior should be general enough to estimate attenuation when it exhibits a range of frequency dependencies. That is, methods that assume Q is independent of frequency may provide attenuation-frequency estimates that are biased by a constant attenuation assumption.

A first embodiment of the invention requires, in addition to processed geophysical data, rock and fluid property information 200. Specifically, the additional data required is dry rock elastic properties: bulk $K_d$ and shear moduli $\mu_d$, grain bulk modulus $K_g$ and density $\rho_g$, rock porosity $\phi$ and permeability $\kappa$. The fluid properties required are bulk modulus $K_f$, density $\rho_f$ and viscosity $\eta_f$. Correct fluid bulk moduli are important for obtaining good estimates of subsurface fluid saturation parameters. It is necessary to have accurate bulk modulus of each fluid, as the contrast in elastic compliance between fluids significantly affects the magnitude of attenuation. Hence, knowledge of reservoir pressure and temperature may be required to refine fluid bulk moduli estimates utilizing principles of thermodynamics.

At step 220, an appropriate rock physics model is chosen. The rock physics model must be able to relate frequency dependent attenuation and velocity dispersion to heterogeneous features of the fluid distribution. That is, the model needs to consider:

a spatial distribution of two or more fluids, like periodic 111 or random 110 patches, to be selected by the user according to, for example, his/her experience in the area of what fluid distributions are more likely, or an empirical determination from saturation experiments on core plugs or fluids, or previous interpretation of similar studies, or the user may examine the asymptotic frequency dependency of the attenuation, among other possibilities for guessing a likely spatial distribution;
 a characteristic length scale 121 of the heterogeneous distribution;
 a relative percentage 130 of fluids, which means the volume fraction of fluid types within an effective volume. (Sometimes the fluid types within an effective volume may be only patches of either oil, gas or water; Alternatively, within the effective volume there may be fluid types within patches that are composites of two or more fluids, such as a mixture of oil and water or oil and gas)

The rock physics model should also include all necessary physical dependencies that impact frequency dependent wave attenuation and velocity dispersion. This means the rock physics model should include all physical factors that result in
 translational shifting of the attenuation and velocity dispersion curves in frequency; (see the examples discussed below in connection with FIGS. 3-7)
 magnitude variation of the attenuation and velocity dispersion (see examples discussed below in connection with FIGS. 8-9).

There are several different rock physics models that satisfy the above requirements. Some appropriate rock physics models include: White et al. 1977, Johnson 2001, Mueller and Gurevich 2004, Toms et al. 2007, and Mueller et al. 2008. There are other rock physics models that may also be utilized within this invention. To assist with choosing an appropriate rock physics model, the attenuation and velocity dispersion data 210 could be analyzed if multiple frequency values were obtained, i.e., if attenuation and velocity have the form $\{Q_1, \omega_1; Q_2, \omega_2; Q_3, \omega_3; \ldots\}$ and $\{v_1; \omega_1; v_2, \omega_2; v_3, \omega_3; \ldots\}$, respectively. The reason is that most rock physics models (with the exception of Mueller and Gurevich 2004 and Toms et al. 2007), specifically assume a spatial distribution of the pore fluids. The spatial distribution greatly impacts the frequency dependent attenuation characteristics predicted by the model $\{\tilde{Q}_1, \tilde{\omega}_1; \tilde{Q}_2, \tilde{\omega}_2; \tilde{Q}_3, \tilde{\omega}_3;\}$. Hence, the observed data values $\{Q_1, \omega_1; Q_2, \omega_2; Q_3, \omega_3; \ldots\}$ could be used to discriminate between rock physics model predictions $\{\tilde{Q}_1, \tilde{\omega}_1; \tilde{Q}_2, \tilde{\omega}_2; \tilde{Q}_3, \tilde{\omega}_3;\}$, so as to eliminate models that do not predict similar behavior.

At step 230, the frequency dependent asymptotes of the rock physics model are derived or already derived (known) asymptotes are obtained for the rock physics model. These are relationships that define the limit of attenuation behavior over a certain frequency range. Usually, two asymptotes can be derived from the rock physics model by considering the limiting cases of model behavior when $\omega \to 0$ and $\omega \to \infty$. For certain rock physics models, which have characteristic length scales and associated frequencies $\omega_i$ or $\omega_1$ and $\omega_2$, it may also be possible to derive other asymptotes $\omega \to \omega_i$ or $\omega_1 < \omega < \omega_2$ for certain model parameters. However, the two unique asymptotes $\omega \to 0$ and $\omega \to \infty$ implicitly contain necessary information on subsurface fluid distribution parameters and can be used together (without other asymptotes) to interpret the attenuation behavior in 210. In this invention, it is preferred to use at least two attenuation asymptotes for any given model.

Figure 11:
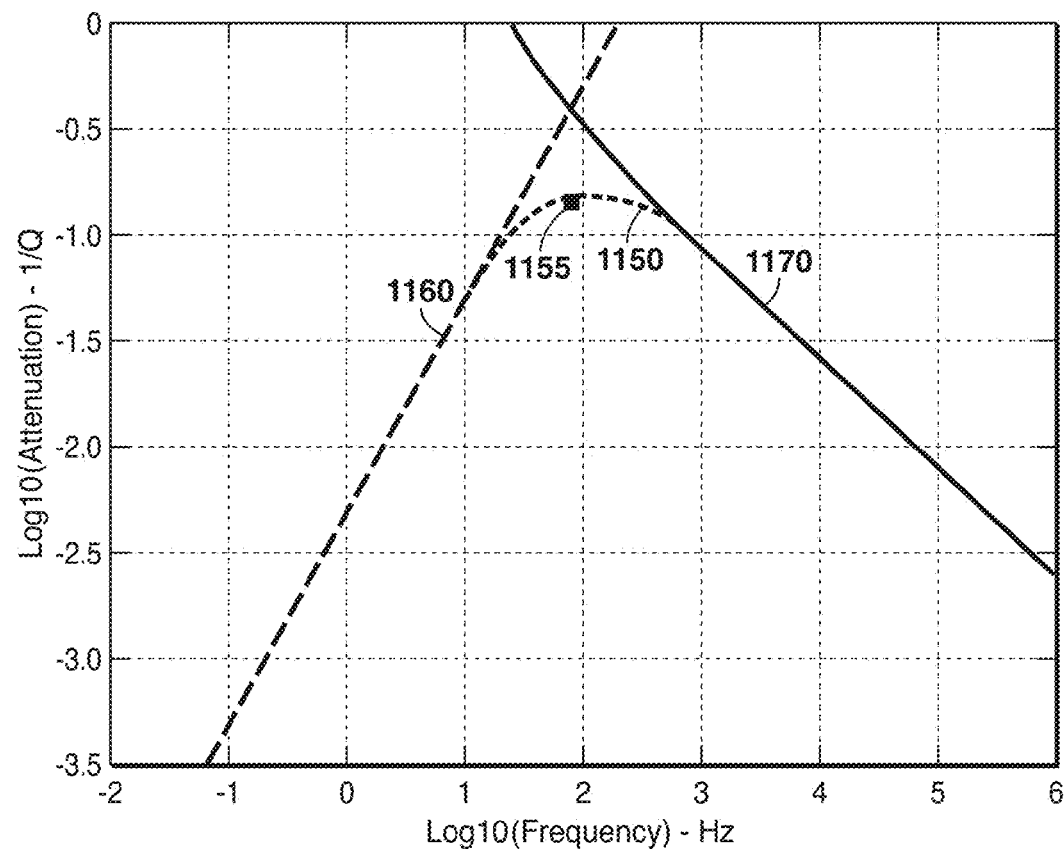
FIG. 11 is a plot of attenuation versus frequency showing a high-frequency asymptote and a low-frequency asymptote derived from the Mueller and Gurevich rock physics model according to the present invention.

For example, consider an embodiment of the invention where the rock physics model of Mueller and Gurevich (2004) is used. If the correlation function that describes the spatial distribution is given by periodically alternating layers, the low frequency asymptote of the attenuation is $$Q^{-1} = \frac{S_1 S_2 L_H^2 s \omega}{12 D_0}, \quad (3.1)$$

where $S_1$, $S_2$ refer to the relative volume fraction of fluids, $L_H$ is the heterogeneity length scale, s a function of the low and high frequency elastic moduli, $D_0$ is the diffusivity and $\omega$ is the frequency. The high frequency asymptote for attenuation is $$Q^{-1} = \frac{1}{1 + \frac{S_1 S_2 L_H \sqrt{2\omega}}{\delta \sqrt{D_0}}}; \quad (3.2)$$

here δ is a function of the low and high frequency elastic moduli. The asymptotes (3.1) and (3.2) derived for this model contain equivalent information on subsurface fluid distribution as the model of Müller and Gurevich (2004) with periodic correlation function. FIG. 11 shows attenuation ($Q^{-1}$) versus wave frequency predicted using the rock physics model (1150), and attenuation estimated using the low (1060) and high (1070) frequency asymptotes. Away from the frequency of peak attenuation (1155), the asymptotes and model are equivalent. In the vicinity of the frequency of peak attenuation, hereinafter also called "peak frequency," the asymptotes do not predict the attenuation correctly; however, they can still be utilized in interpreting attenuation around the peak frequency (step 240). This is demonstrated in the example section. The reason is the two asymptotes are unique for each rock physics model, such that attenuation variation with frequency is uniquely defined once two asymptotes are known.

The derived or known asymptotes of a specific rock physics model can assist with determining whether the rock physics model employed to interpret the attenuation is appropriate. That is, if the attenuation asymptotes do not exhibit the same frequency dependence as the geophysical data $\{Q_1,\omega_1; Q_2,\omega_2; Q_3,\omega_3; \ldots\}$ then that specific rock physics model should not be chosen. The exception is when the attenuation data $\{Q_1,\omega_1; Q_2,\omega_2; Q_3,\omega_3; \ldots\}$ is constant with frequency. Then it is not possible to use the asymptotes to evaluate whether a specific rock physics model should be chosen or not. Where there is a good correspondence between asymptotes and the geophysical data, it indicates the likely spatial distribution of heterogeneities, like periodic 110 or random 111 patches, or random and periodic layering (see FIG. 10).

At step 240, each asymptote is inverted, so that one subsurface parameter is a function of attenuation, frequency and the second subsurface parameter. In general, the attenuation asymptote will take the form $$Q^{-1} = f(\omega, L_H Q^{-1}, S_i, P), \quad (3.3)$$

where ω is frequency, $L_H$ refers to the heterogeneity length scale (120), $S_i$ refers to the relative volume fraction (130) of fluids and P is a parameter containing rock and fluid property information. This function can be inverted so as that the heterogeneity length scale $L_H$ is a function of the other parameters:

$$L_H = f(\omega, Q^{-1}, S_i, P). \quad (3.4)$$

For instance, assuming a periodic distribution of fluids, the low frequency attenuation asymptote (3.1) is given by $$L_H = \left[\frac{12 D_0}{\omega S_1 (1 - S_1) s Q}\right]^{\frac{1}{2}} \quad (3.5)$$

and the high frequency attenuation asymptote (3.2) is $$L_H = \sqrt{\frac{D_0}{2\omega}} \frac{(Q-1)\delta}{S_1(1-S_1)}. \quad (3.6)$$

Other fluid distributions would have different forms of asymptotes (3.3) which would result in different length scale-attenuation relationships of which (3.4) is the generalized functional form. It is preferred to invert at least two frequency asymptotes for any given rock physics model, that is, a low and a high frequency asymptote. In Table 1, asymptotes derived from specific rock physics models are given. These are some of the inverted asymptotes that may also be utilized to interpret the geophysical data. In Table 1, $S_1$, $S_2$ refer to the relative volume fraction of fluids, $L_H$ is the heterogeneity length scale, s a function of the low and high frequency elastic moduli, $D_0$ is the diffusivity coefficient and ω is the frequency. Alternatively, the relative volume fraction $v_i$ may be expressed as a function of the other parameters such that $$S_i = f(\omega, Q^{-1}, L_H, P^*). \quad (3.7)$$

However, using the latter approach is difficult as the P parameters also have dependencies on the relative volume fractions $v_i$ which need to be isolated to form P*.

TABLE 1

Displaying inversion scenarios for the saturation dependencies

| Geometry | $Q^{-1}$ frequency dependence | Saturation heterogeneity length scale $L_H$ from asymptote |
|---|---|---|
| Periodic layering low-frequency asymptote | ω | $\left[\dfrac{12 D_0}{\omega S_1 (1 - S_1) s Q}\right]^{\frac{1}{2}}$ |
| Random layering low-frequency asymptote | $\sqrt{\omega}$ | $\sqrt{\dfrac{2 D_0}{\omega}} \dfrac{1}{s(Q+1)}$ |
| Periodic layering high-frequency asymptote | $\dfrac{1}{\sqrt{\omega}}$ | $\sqrt{\dfrac{D_0}{2\omega}} \dfrac{(Q-1)\delta}{S_1(1-S_1)}$ |
| Random layering high-frequency asymptote | $\dfrac{1}{\sqrt{\omega}}$ | $\sqrt{\dfrac{D_0}{2\omega}} (1-Q)\delta$ |

At step 250, the inverted asymptotes are utilized to interpret geophysical attenuation data $\{Q_1,\omega_1; Q_2,\omega_2; Q_3,\omega_3; \ldots\}$; velocity dispersion data can also be utilized in this step $\{v_1;\omega_1; v_2,\omega_2; v_3,\omega_3; \ldots\}$. The approach is to substitute one attenuation value $\{Q_1,\omega_1\}$ into each inverted asymptote. Then it is necessary to iterate through the parameter space of the independent subsurface parameter in a physically reasonable way. That is, if heterogeneity length scale $L_H$ is functionally dependent on relative fluid saturation $v_i$ (i.e. inverted asymptote (3.4)), it is necessary to vary relative fluid saturation from 0% to 100% (see FIGS. 13-16). This must be conducted for each inverted asymptote. The intersection of the inverted asymptotes uniquely determines the heterogeneity length scale $L_H$ (270) and the relative fluid saturation $v_i$ (280) of most subsurface fluid distributions. To obtain the spatial distribution of different pore fluids (260), one may try different fluid distributions to estimate the length scales and saturation. The fluid distribution (i.e. the spatial distribution of different pore fluids) constrains the frequency-dependent attenuation behavior. Most rock physics models are not general and are derived for specific spatial distributions of pore fluids. In these cases, the attenuation and velocity relationships are valid only for the assumed fluid distribution. However, there are several rock physics models (e.g., Gurevich and Lopatinkov 1995, Müller and Gurevich 2004, Toms et al 2007) that are general in that the attenuation and velocity frequency behavior can be specified in terms of a function of the spatial distribution of porefluids, and hence spatial distribution is a variable, i.e a parameter, of the model. However, in practice one then assumes a distribution in terms of a correlation function to estimate what the attenuation/velocity behavior would be. If there are multiple attenuation-frequency points it may be possible to eliminate certain fluid distributions at the outset because of the asymptotic behavior.

There may be benefits to using a general rock physics model for the analysis, even though one has to choose a distribution. Within generalized rock physics models, the mathematical formulation/framework for each different distribution is the same. When one switches between different rock physics models, which a priori assume specific fluid distributions, the underlying mathematical formulation for the poro-elastic parameters can be very different. This complicates the use of inversion to extract saturation and length scale information.

On occasion there may be two intersection values of the heterogeneity length scale $L_H$ and relative fluid saturation $v_i$. In these cases, velocity dispersion could be used as extra information to determine the correct fluid saturation. Alternatively, the values can be re-substituted into the full rock physics model as described in Example 4 and the best results chosen based on the behavior of the rock physics relationships. In circumstances where two intersection points occur, the full rock physics model needs to be employed utilizing the heterogeneity length scale and relative fluid saturation relationships and $\{Q_1,\omega_1; Q_2,\omega_2; Q_3,\omega_3; \ldots\}$ and velocity $\{v_1; \omega_1; v_2,\omega_2; v_3, \omega_3; \ldots\}$ data. By comparison of either geophysical data set with the model responses utilizing the heterogeneity length scale and saturation relations a unique intersection point can be interpreted, which indicates the actual length scale and relative saturation.

The description above is the forward-modeled utilization of the inverted asymptotes (which works with attenuation and velocity values at one or more frequencies) to determine the subsurface fluid distribution parameters. With multiple measurements of attenuation and velocity as a function of frequency, the inversion can be set up using a forward model of attenuation and dispersion based on the rock physics relationships and asymptotes and solving for the saturation parameters with the greatest likelihood of matching the data in a least squares sense. The analysis may be done first for individual frequency measurements (see FIG. 13). Then an average of these results may be used as initial model and the attenuation and dispersion predicted using the rock physics relationship (see FIGS. 14-16). The model may then be updated so that the predicted values better match the measurements within the constraints of reasonable physical behavior and geological knowledge. Preferably, this inversion scheme would weight the attenuation and dispersion values by their relative uncertainties allowing for the fact that measurements at one frequency range (for example, for sonic logging frequencies) might be more accurate than measurements at another frequency range (for example, for seismic frequencies).

EXAMPLES

Compressional wave attenuation and velocity dispersion are affected by many different characteristics of pore fluid saturation and rock properties. In the examples shown below three different behaviors are examined. The first example demonstrates the influence of rock permeability and heterogeneity length scale on wave attenuation and velocity dispersion. It is shown that changes in rock permeability or heterogeneity length scale result in lateral shifts of attenuation/dispersion curves with frequency. The second set of examples explores the impact that rock stiffness and fluid contrast have on the magnitude of attenuation. The influence of average fluid saturation on attenuation is a secondary factor that also affects the magnitude of attenuation. The third example illustrates the influence of different fluid spatial distributions on wave attenuation and velocity dispersion. It is demonstrated that random and periodic layering of subsurface fluid distributions results in different frequency dependency of the attenuation. The last set of examples illustrates a workflow for prediction of subsurface fluid distributions from attenuation.

Example 1

Where is the Peak Frequency of Attenuation?

In this example, P-wave velocity dispersion and attenuation are modeled assuming a periodic distribution of light oil and water with a porosity 22%. The Biot coefficient of the rock is 0.824 (see definition below). Two different cases are examined. In FIGS. 3A-3C and 4A-4C, the characteristic length scale of the spatial distribution of fluid is fixed at 40 cm, while rock permeability is altered from 1 Darcy to 10 milli-Darcy. In FIGS. 5A-5C and 6A-6C, the characteristic length scale of the fluid distribution is altered from 4 m to 4 cm, while rock permeability is fixed at 1 Darcy. The attenuation curves (e.g., 430 in FIGS. 4A-4C) are plotted in logarithmic inverse Q to demonstrate the frequency dependence of attenuation. Other representations of Q with respect to log frequency, such as Q or inverse Q do not reveal the exact frequency dependence of the attenuation. Similarly, the velocity dispersion curves (e.g. 330 in FIGS. 3A-3C) are plotted on a logarithmic frequency scale. In each drawing, the shaded regions ranging from lightest to darkest correspond to different geophysical observation bandwidths: seismic (e.g., 340), VSP (350), cross-well (360), borehole logging (370), and laboratory (380), respectively.

When rock permeability changes from 1 Darcy to 10 milli-Darcy (FIGS. 3A-3C), the dispersion curve for velocity is shifted to lower frequencies. The translation across frequency influences the velocity dispersion observed within each bandwidth. For instance, across the seismic bandwidth [10-60 Hz] there is approximately 1% (~25 m/s), 3% (100 m/s) and 1% (25 m/s) velocity dispersion estimated for each scenario. In addition, the functional dependence of velocity on frequency varies from being nonlinear to linear to nonlinear. Within the seismic bandwidth, the most permeable rock (3A) has the lowest P-wave velocities, whilst the least permeable rock (3C) has the highest wave velocities. Similar observations can be made for the other geophysical bandwidths.

Figure 4A:
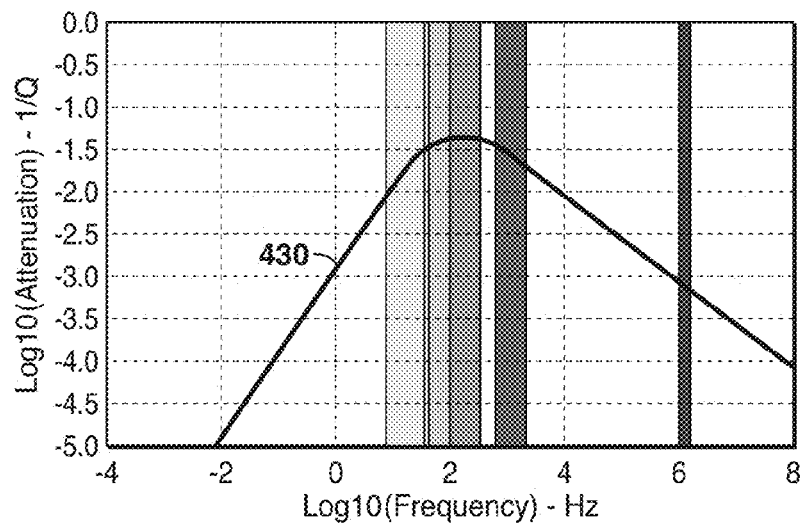
FIGS. 4A-4C show frequency dependent P-wave attenuation for rocks of different permeability.
Figure 4B:
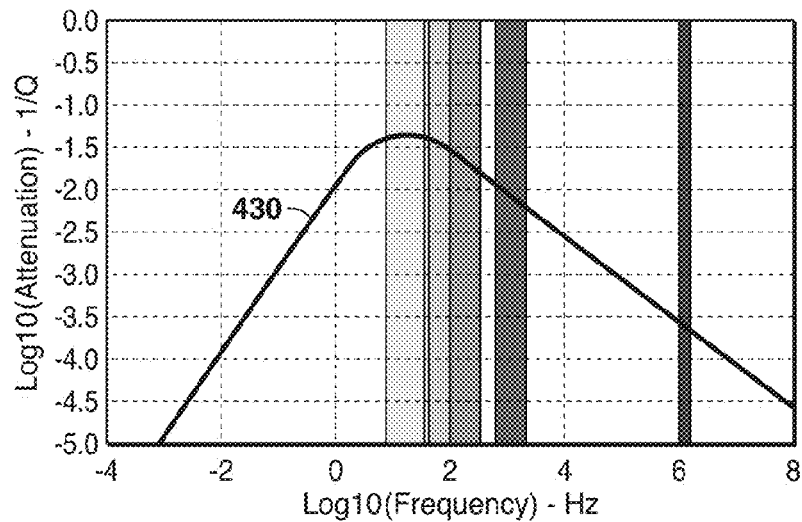
Figure 4C:
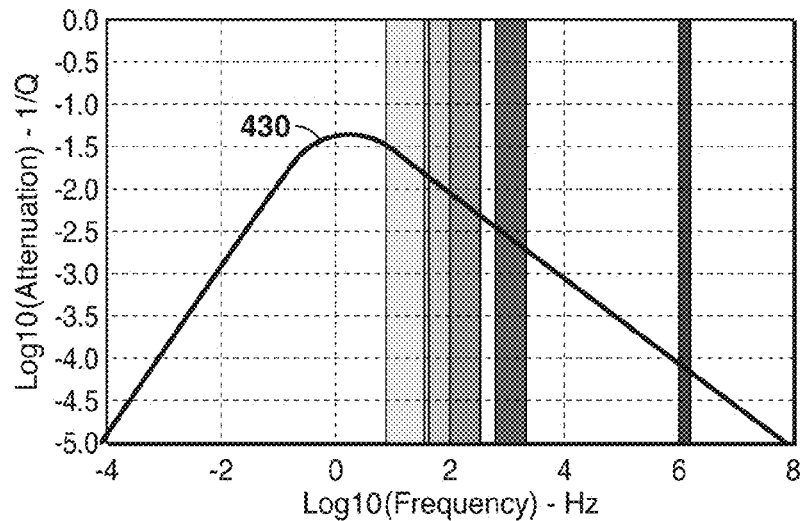

FIGS. 4A-4C show that changes in rock permeability from 1 Darcy to 10 milli-Darcy also result in lateral shifts of the attenuation curve 430 with respect to frequency. This can easily be observed by considering the point at which attenuation is a maximum, the corresponding frequency is known as the peak frequency of attenuation. The peak frequency of attenuation also represents the frequency at which P wave velocity changes most rapidly with respect to frequency. As rock permeability decreases the peak frequency of attenuation occurs within different bandwidths from cross well to seismic to low frequency (1 Hz). The translation of the attenuation curve with respect to frequency has a two fold impact. Firstly the magnitude of attenuation within each bandwidth changes and secondly the frequency dependent behavior changes significantly. For instance, within the seismic bandwidth from 10 Hz to 60 Hz, the attenuation behavior increases linearly with frequency, is constant with frequency or decreases with square root of frequency. The translation also impacts the magnitude of attenuation at each frequency, the greatest magnitude of attenuation with the seismic bandwidth occurs when the peak frequency is centered within this bandwidth. When the peak frequency is centered at other bandwidths, the magnitude of attenuation is decreased; although it still is significant if the peak frequency is situated within a neighboring frequency bandwidth.

It may be noted from FIGS. 3A-3C and 4A-4C that peak frequency is strongly influenced by the permeability. Therefore, the present inventive method should also be suitable for estimating permeability as well as, among others, fluid saturation and heterogeneity length scale.

Figure 5A:
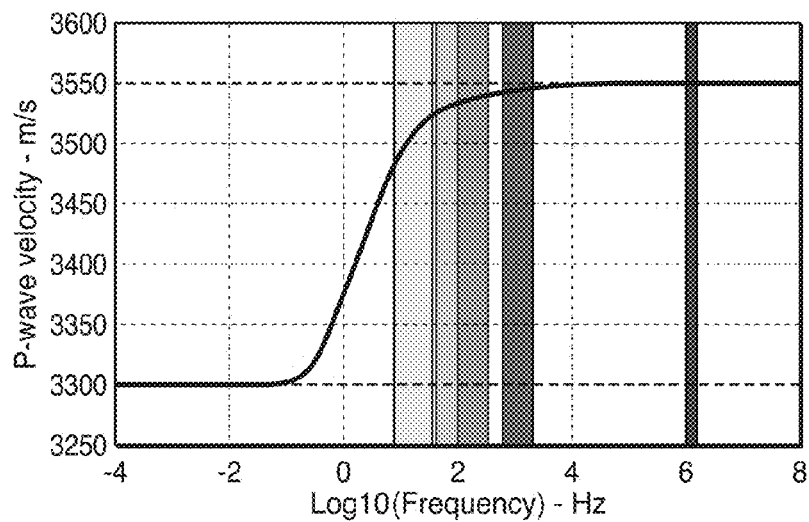
FIGS. 5A-5C show P-wave dispersion for rock of permeability 1 Darcy, for varying length scales of saturation homogeneities.
Figure 5B:
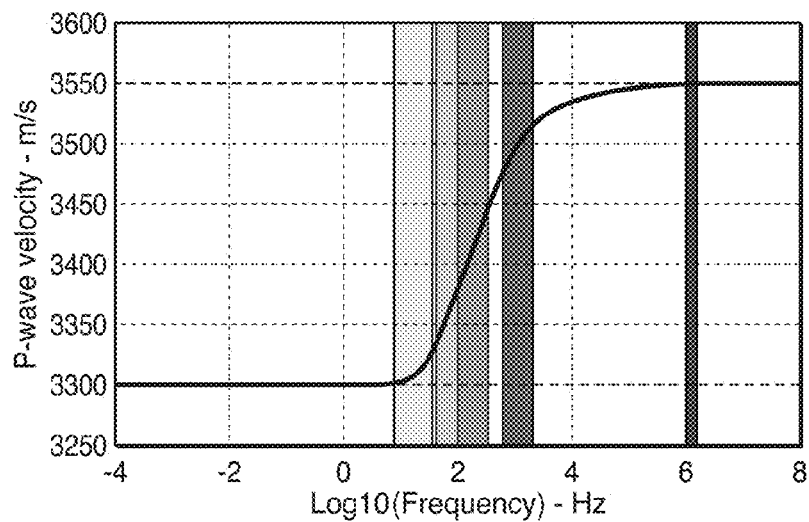
Figure 5C:
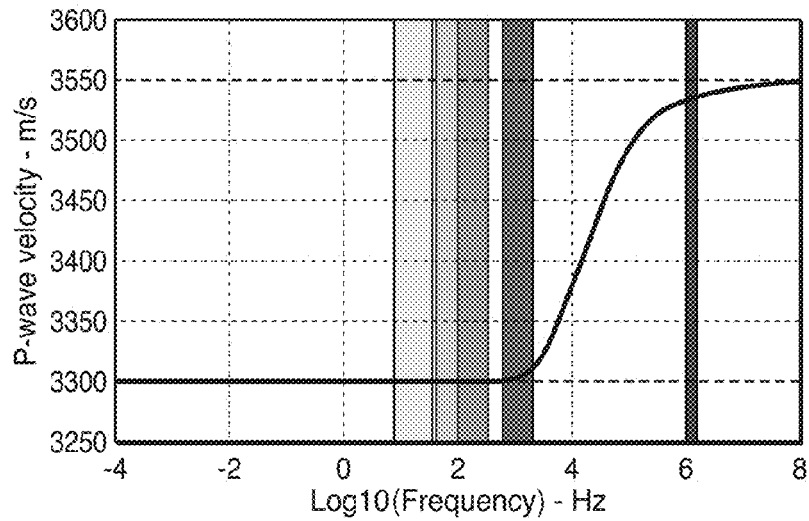

In FIGS. 5A-5C and 6A-6C, rock permeability is fixed at 1 Darcy, but the characteristic length scale of the light oil patches is altered. FIGS. 5A-5C show that altering the characteristic length scale of the heterogeneous patches of oil causes the velocity dispersion curve to translate with respect to frequency. That is, as the characteristic length scale varies from 4 m to 4 cm the dispersion curve is shifted to higher frequencies. Translation of the dispersion curve with respect to frequency alters both the measured P wave velocity within each bandwidth, the gross percentage of dispersion and the velocity dependence on frequency. For instance, within the seismic bandwidth, when the patch size is 4 m the velocity measured varies from 3500 m/s to 3525 m/s, which represents less than 1% velocity dispersion. When the heterogeneity length scale is 40 cm the velocity decreases rapidly to 3325-3300 m/s, with less than 1% velocity dispersion. Finally, when the characteristic length scale is 4 cm, the velocity is constant within the seismic bandwidth at 3300 m/s.

Figure 6A:
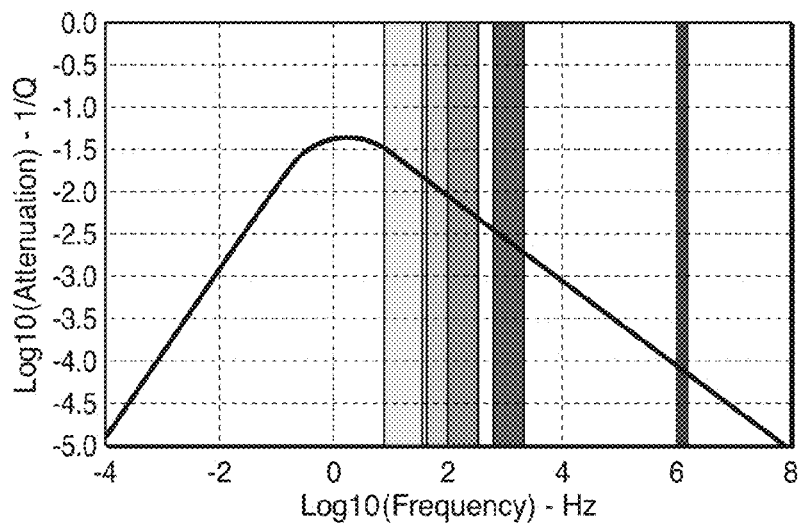
FIGS. 6A-6C show frequency dependent P-wave attenuation for rock of permeability 1 Darcy, for varying length scales of saturation homogeneities.
Figure 6B:
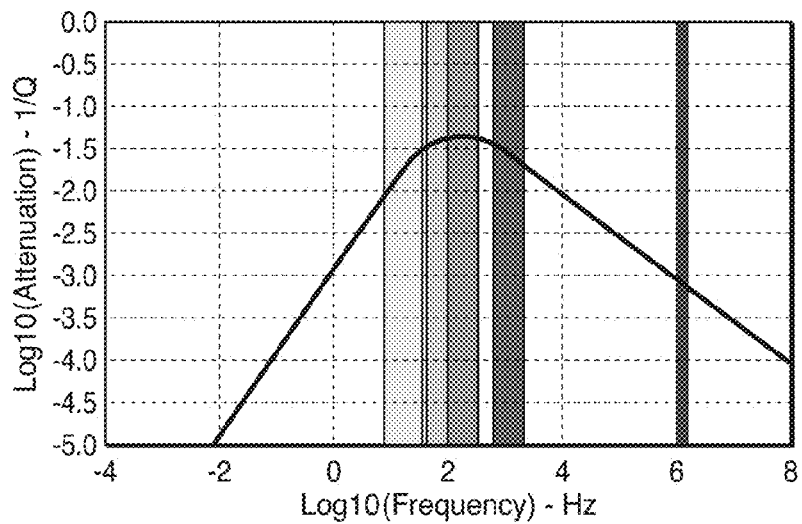
Figure 6C:
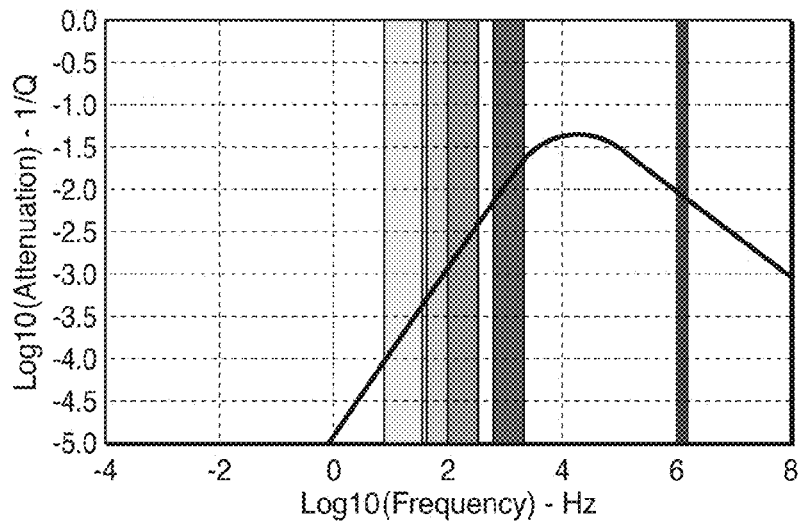

Similarly, FIGS. 6A-6C show that altering the characteristic length scale of the light oil heterogeneities also causes lateral shifting of the attenuation curve with respect to frequency. As the characteristic length scale of the heterogeneities decreases from 4 m to 4 cm, the peak frequency of attenuation shifts to higher frequencies. Frequency translations of the attenuation curve result in changes in attenuation magnitude and frequency dependent behavior within a given bandwidth. In this scenario, for the seismic bandwidth (10-60 Hz), 4 m heterogeneities cause attenuation to decrease with frequency, while 40 cm and 4 cm heterogeneities cause attenuation to increase with frequency.

Figure 7:
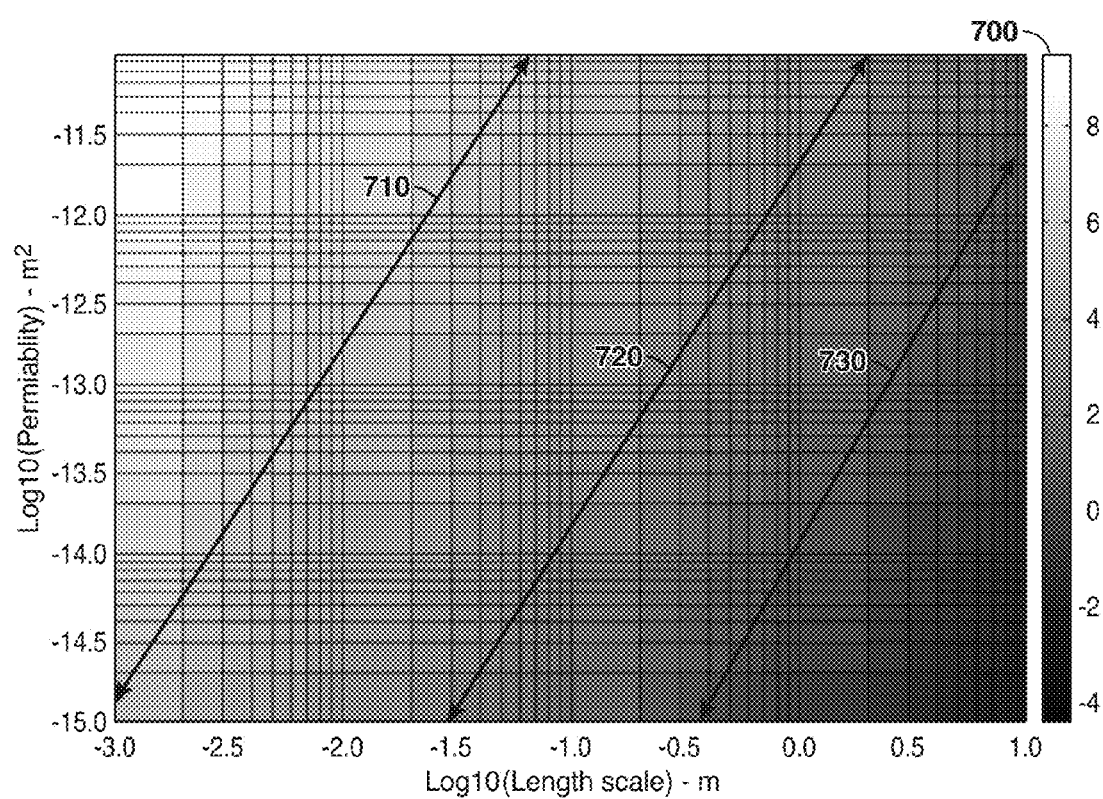
FIG. 7 shows peak frequency of attenuation for different permeability rocks having different heterogeneity length scales, where frequency is represented by gray-scale shading.

When variations in rock permeability are considered in conjunction with alterations in the characteristic length scale of fluid heterogeneities, it is possible to determine the peak frequency location. FIG. 7 shows a crossplot of permeability and characteristic length scale. Each quantity is plotted in log base 10. This means that for the heterogeneity length scale, 0 corresponds to 1 m, −1 corresponds to 10 cm, −2 corresponds to 1 cm, −3 corresponds to 1 mm, etc. The gray-scale bar represents the peak frequency of attenuation. Light colors indicate that the peak frequency occurs at higher frequencies, while darker colors indicate that the peak frequency occurs at low frequencies. Three different lines are shown in the diagram according to different geophysical measurements. 730 shows that there is a range of rock permeabilities and characteristic length scales for which attenuation peaks within the seismic bandwidth. Similarly, line 720 shows attenuation will peak within the logging frequencies for a different set of rock permeabilities and characteristic length scales, while line 710 indicates that the peak frequency will be located at even higher frequencies for the laboratory frequency band.

To summarize, alterations of rock permeability or characteristic length scale result in lateral frequency shifts of attenuation and dispersion. Alterations in rock permeability or characteristic length scale do not change the peak magnitude of attenuation (at the peak frequency) or the gross percentage of velocity dispersion. However, when attenuation and dispersion are analyzed within a single observation bandwidth, the resulting lateral shift of attenuation and dispersion curves result in changes of attenuation magnitude/behavior and percentage dispersion across the observation bandwidth. When permeability and length scale changes are considered together, it is possible to define the location of the peak frequency of attenuation in terms for different permeable rocks and different heterogeneity length scales. It is evident that there is a large set of possible permeability rocks, which have characteristic heterogeneity length scale which result in the peak frequency of attenuation being situated in any one observation bandwidth.

Example 2

What is the Magnitude of Attenuation at the Peak Frequency?

In this example the magnitude of attenuation is analyzed as a function of rock frame stiffness and fluid bulk moduli contrast. Both factors significantly impact the magnitude of attenuation across the entire frequency bandwidth. Specifically, the magnitude of attenuation at the peak frequency will be examined. This represents the maximum attenuation that can arise for a specific combination (and concentration) of pore fluids within a rock of certain elastic stiffness. Here the rock frame stiffness is parameterized in terms of the Biot coefficient $\alpha_R$, which is a measure of bulk macroscopic compressibility of a volume of dry rock relative to the compressibility of its constituent materials. The Biot coefficient is defined as $$\alpha_R = 1 - \frac{K_d}{K_g},$$

where $K_d$ is the bulk modulus of the dry rock and $K_g$ is the bulk modulus of the grain material. When $\alpha_R \to 0.5$, the rock is stiff and the acoustic response (attenuation, velocity) of a partially saturated rock will be dominated by the acoustic characteristics of the dry rock. When $\alpha_R \to 1.0$, the rock is very compressible and the acoustic response (attenuation, velocity) will be significantly impacted by the saturating fluid. Both the relative concentration of fluids and the contrast in fluid bulk moduli between respective pore fluids may have significant impact on the acoustic properties (attenuation, velocity). Here the fluid contrast $\alpha_F$ is defined as $$\alpha_F = 1 - \frac{K_{f1}}{K_{f2}},$$

where $K_{f1}$ is the bulk modulus of the most compressible fluid and $K_{f2}$ is the bulk modulus of the stiff (least compressible) fluid. When $\alpha_F \to 1$, fluid bulk moduli differ significantly, hence there is large contrast in fluid compressibilities. However, when $\alpha_F \to 0.5$, the compressibility of the pore fluids are of the same order of magnitude and there is little contrast in their elastic properties. The elastic properties of fluids such as water, oil and gas depend significantly on subsurface pressure and temperature. Also, the bulk moduli of water, oil and gas is affected by the specific chemical compositions, respectively, i.e. salt, API, etc.

Figure 8:
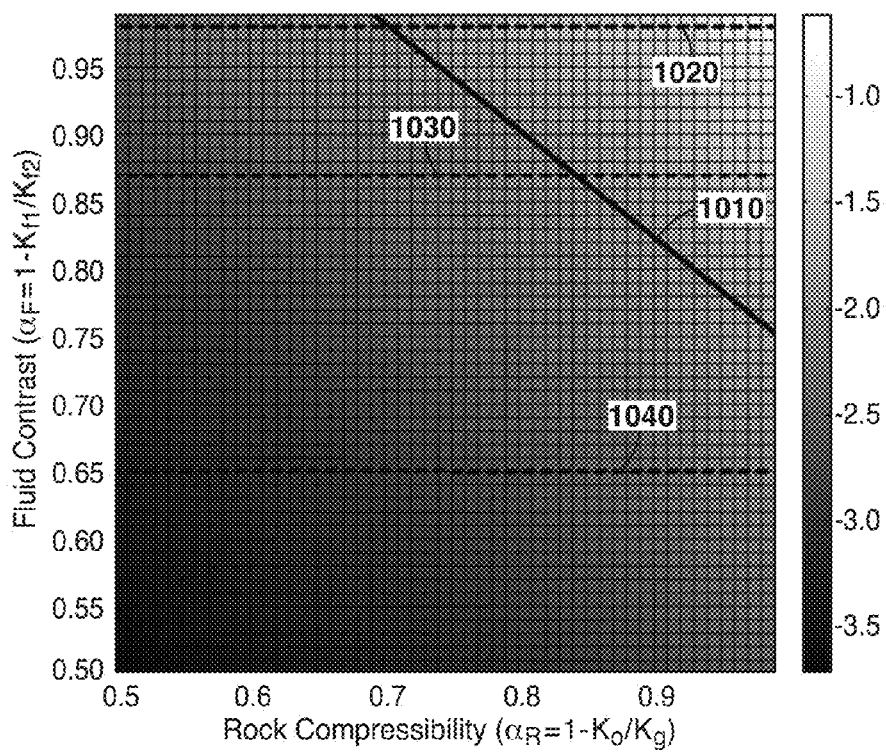
FIG. 8 is an attenuation cross plot of fluid contrast and rock compressibility, where the gray-scale is a measure of attenuation.

In FIG. 8, the Biot coefficient of the rock is altered from $\alpha_R=0.5 \rightarrow 1.0$ and the fluid contrast is altered from $\alpha_F=0.5 \rightarrow 1.0$. The peak magnitude of attenuation given by inverse Q is shown in the color bar as log base 10. The darkest colors correspond to small attenuation, while the lightest colors indicate significant attenuation. The data values above line 1010 indicate regions where attenuation is significant. The relative concentration of the most compressible fluid to the least compressible fluid is $v_{f1}=0.10$. The spatial distribution of the pore fluids is described by an exponential correlation function. The fluid bulk modulus of the least compressible fluid is taken to be $K_{f2}=2.84$ GPa corresponding to water. The grain bulk modulus is $K_g=76$ GPa, which corresponds to the elastic moduli of calcite grains. The horizontal line 1020 indicates likely gas-water response, while 1030 indicates likely light oil-water response and line 1040 indicates higher API oil and water. For any given line, the attenuation decreases as rock stiffness increases (i.e. traversing right to left across the picture). Clearly, the greater the contrast in fluid bulk moduli (line 1020 versus line 1040), the greater the potential attenuation for any given rock stiffness.

Figure 9:
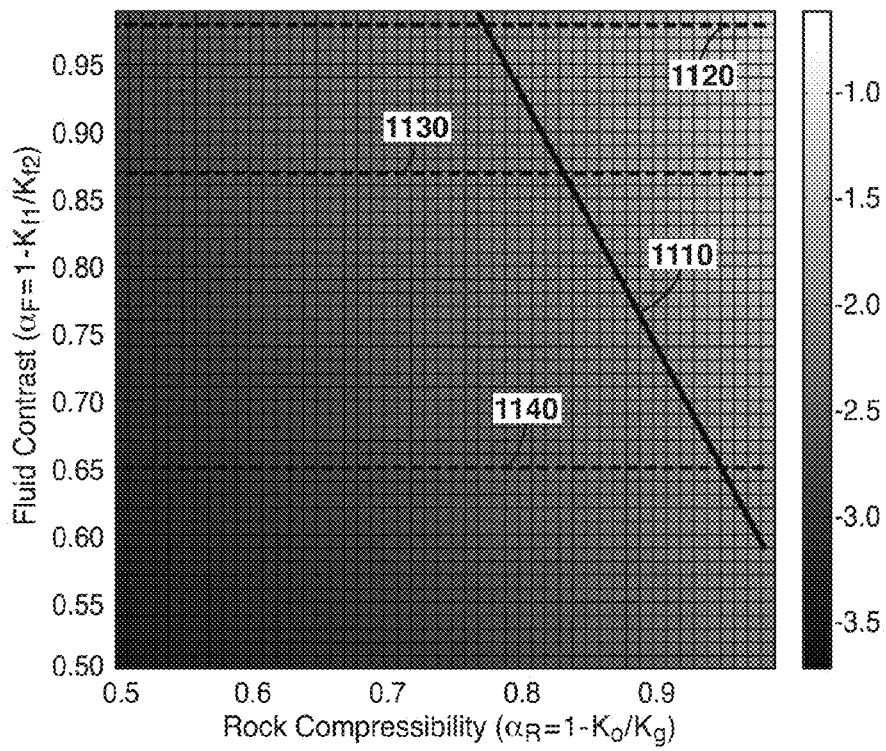
FIG. 9 is a cross plot like FIG. 8, except that the ratio of concentration of the most compressible fluid to the least compressible fluid is 0.4 instead of 0.1 as it is for FIG. 8.

In FIG. 9, the relative concentration of the most compressible fluid to the least compressible fluid is $v_{f1}=0.40$. There is a slight change in the magnitude of attenuation (shades of gray) across the parameter space. In general there is increase in attenuation for the lower contrast fluid systems (1130-1140), while a reduction in attenuation observed for the largest contrast systems (1120). The data values above line 1110 indicate regions where attenuation is significant. Line 1120 represents attenuation values for a range of rock compressibilities for a system of 40% gas with 60% water. Line 1130 shows attenuation values for a range of rock compressibilities with 40% light oil and 60% water. As the concentration of less compressible fluids increases attenuation is significant over a larger range of rock compressibilities. For instance, line 1140 indicates that attenuation is significant for certain rocks even for a heavier oil water system.

Example 3

The Influence of Spatial Distribution on Frequency Dependent Attenuation

Figure 10A:
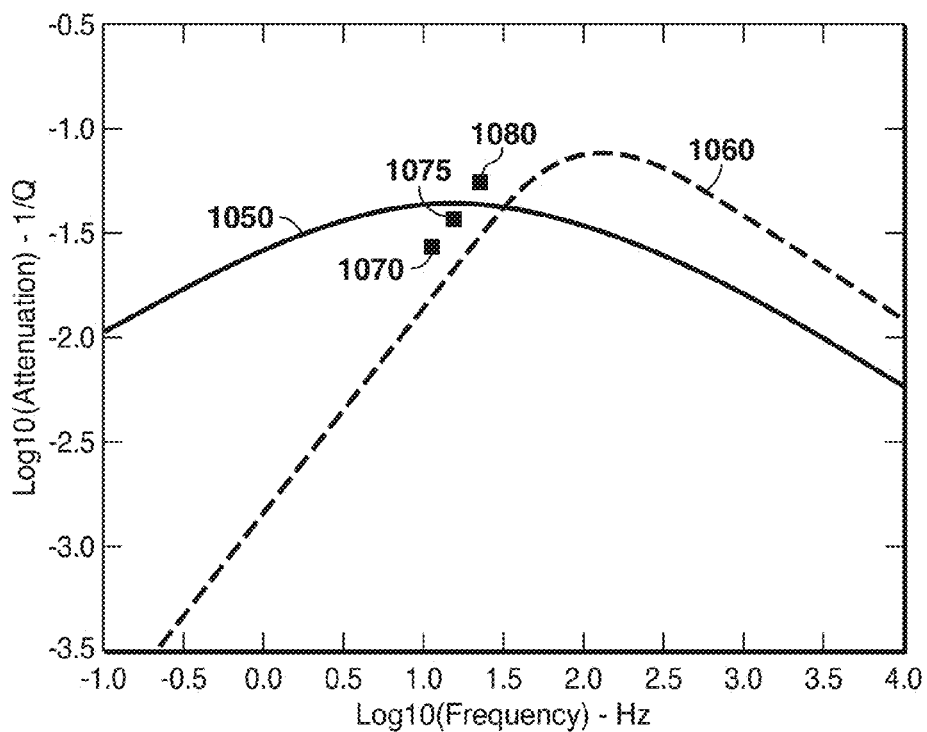
FIGS. 10A-10B show attenuation (A) and velocity dispersion (B) estimated using a Mueller and Gurevich rock physics model by assuming two different spatial distributions of fluids, random and periodic.
Figure 10B:
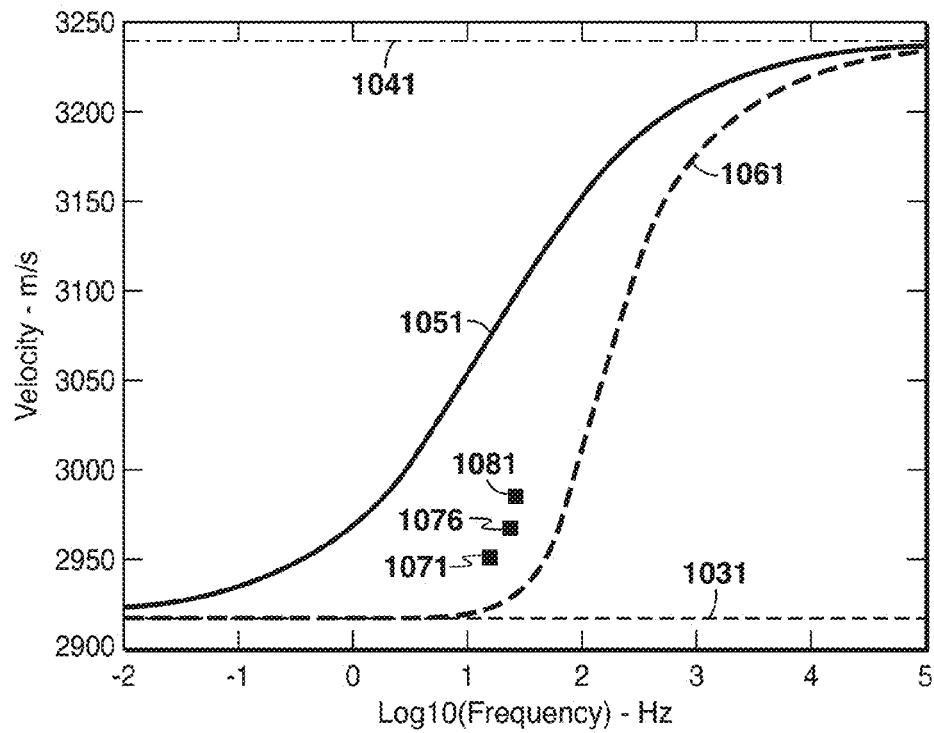

FIGS. 10A-B demonstrate the effect of different spatial distributions on the frequency dependent characteristics of attenuation (10A) and velocity dispersion (10B). While only random and periodic layering of fluid heterogeneities were modeled, the effect of having different spatial distributions is well documented in the literature; see for example Mueller et al. 2008. The impact is that attenuation will increase or decrease more quickly for some fluid distribution patterns than others.

In FIGS. 10 A-B, attenuation and velocity dispersion is estimated using the Mueller and Gurevich (2004) rock physics model by assuming two different spatial distributions of fluids. Here 1050 and 1051 refer to attenuation and velocity dispersion estimated assuming a random distribution of heterogeneous layers. Here 1060 and 1061 refer to attenuation and velocity dispersion estimated using a periodic distribution of heterogeneous layers. The difference in how attenuation and velocity varies with frequency as frequency decreases, arises because of the different spatial distributions of pore fluids. If measured geophysical values are present at different frequencies, like attenuation (1070, 1075, 1080) and velocity (1071, 1076, 1081) then the frequency dependence of the data points can be used to assist with determining the spatial distribution of pore fluids (and hence appropriate rock physics models to use in the invention). In this case, it is obvious that random layering of fluid heterogeneities produces frequency dependent behavior which is different from the geophysical data points, however models which assume periodic layering could potentially be utilized to interpret the data. 1041 and 1031 represent the velocity theoretical lower and upper limits of velocity which are independent of spatial distribution of fluids.

Example 4

Figures Demonstrating the Method for Interpretation of Intrinsic Q

Figure 12:
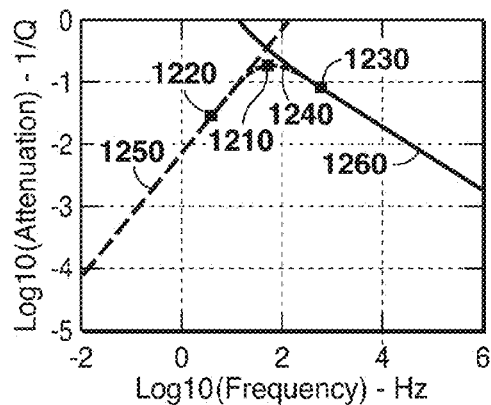
FIG. 12 is a plot like FIG. 11 showing key features of utilizing the asymptotes to interpret attenuation behavior according to the present invention.
Figure 13:
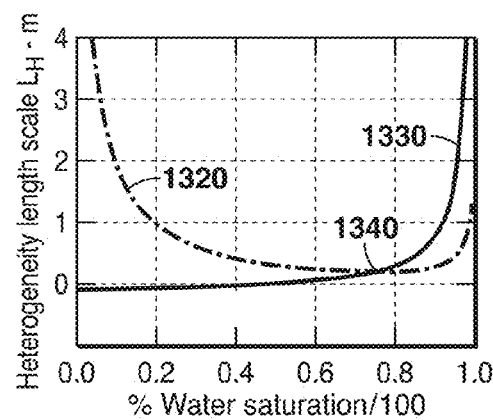
FIG. 13 shows the inverted asymptotes plotted as a cross plot between heterogeneity length scale and percentage of water saturation, using the data on attenuation versus frequency that was modeled for this example, where the intersection of the two inverted asymptote defines the length scale and relative saturation of the fluid distribution; and for FIGS. 14-16, the heterogeneity scale length as a function of water saturation from FIG. 13 is substituted into the rock physics model, and for the frequency corresponding to each of the three input data points, attenuation is plotted versus percentage of water saturation for both the low-frequency asymptote and the high-frequency asymptote of the model, enabling a determination of whether each input data frequency point is located at the peak frequency of attenuation or at frequencies above or below the peak frequency.

FIG. 12 demonstrates the key features of utilizing the asymptotes to interpret attenuation behavior. The attenuation 1210 is modeled using the rock physics model of Mueller and Gurevich 2004 assuming periodically alternating layers. Both the low (1250) and high (1260) frequency asymptotes are given in equations (3.1) and (3.2). Attenuation data points are selected across the spectrum of frequencies (low: 1220, peak: 1240 and high: 1230). In reality these data points would be supplied from the geophysical data. In FIG. 13, the inverted asymptotes (Eqs. (3.5) and (3.6)) are plotted as a function of water saturation utilizing one attenuation and frequency point. 1320 is the inversion of the low-frequency asymptote 1250, and 1330 is the inversion of the high-frequency asymptote 1260. Referring to FIG. 13, the intersection (1340) of the two inverted asymptotes (1320 and 1330) defines the length scale and relative saturation of the fluid distribution. Irrespective of whether observation point 1220, 1230 or 1240 is substituted into the inverted asymptotes, all produce a consistent length scale-saturation relation; i.e. all produce the same low (1320) and high (1330) frequency inverted asymptotes. Thus, interpretation can be performed with a single attenuation or frequency pair, regardless of lack of knowledge about whether it is on the low or high frequency side of the peak. With measurements at multiple frequencies, we can reduce uncertainties associated with measurement error by separately analyze each pair and averaging the results or solving for the most likely parameters using least squares. In addition to using attenuation, if available, velocity dispersion can also be analyzed to independently determine water saturation.

On the other hand, an issue with using, for example, seismic data and also log data, aside from REV (representative elementary volume) fluid distribution concern, is that often the attenuation values are only significant within a certain window of observation, as several of the figures show, and hence from that standpoint it does not make sense to combine data where measurement errors may be considerably different in an attempt to add additional certainty to the inversion. Moreover, one does not get additional physical information from adding more frequency points, but rather from utilizing different asymptotes. Whether data redundancy helps or not is a decision the user of the invention can make in the context of the particular application.

Figure 14:
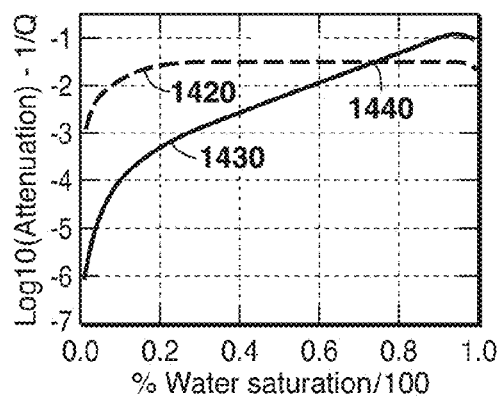
Figure 15:
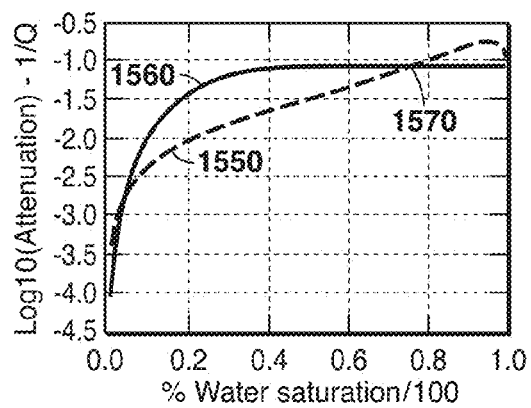
Figure 16:
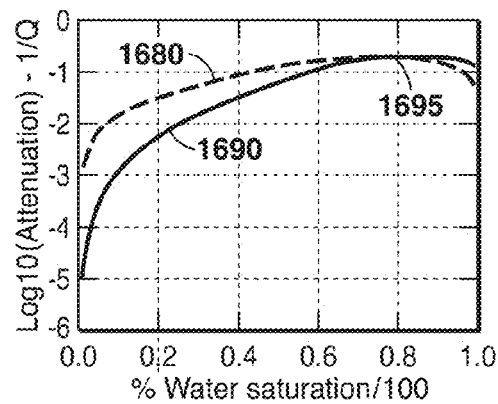

Further analysis using the rock physics relationships may also be useful. In FIG. 14-16, substitution of the length scale-saturation relations back into the rock physics model allows one to determine whether the frequency point 1220 (or 1230 or 1240) is located at the peak frequency of attenuation or at frequencies above or below the peak frequency. 1420 is the rock physics model constrained by the inverted asymptote 1320. 1430 is the rock physics model constrained by the inverted asymptote 1330. (1440 is their intersection, which occurs at the same value of water saturation as intersection 1340 in FIG. 13.) For example, curve 1330 may be obtained by substituting the frequency/attenuation data point 1220 into an inverted high-frequency asymptote equation such as equation (3.6), and then using that relationship to plot heterogeneity length scale versus saturation. Experience teaches that the constrained curve that is flattest with respect to variation in attenuation as water saturation changes depicts the frequency location of the attenuation point. That is, in this example the frequency point (1220) is located on the low frequency asymptote as the constrained rock physic model (1420) is flat. FIG. 15 shows the same constrained rock physics curve using the input data from 1230; however, this time the input data frequency point is shown to be located on the high frequency asymptote 1260, as the curve 1560 is flattest. (1550 is the inverted low-frequency asymptote and 1570 is the intersection point.) FIG. 16, which uses the frequency point 1240, shows both constrained curves 1680 and 1690 vary significantly with water saturation. This indicates that the frequency point 1240 occurs in the vicinity of the peak frequency. The intersection points 1440, 1570, and 1695 indicate relative fluid saturation.

Example 4 shows that one can determine where the Q value at a specific frequency is relative to the peak frequency of attenuation. That is, one can work out whether its frequency is less than the peak frequency and hence rests on the low frequency asymptote or occurs at the peak frequency of attenuation (in which case it does not rest on either asymptote) or whether the value rests on the high frequency asymptote. The benefit of knowing this information is that one can determine whether attenuation is increasing, decreasing, or is approximately constant with frequency. The above-described re-substitution technique of example 4 is especially useful when the curves in FIG. 13 cross in two places. In that event, the asymptotes will change rapidly in the vicinity of saturation for one of the intersection points, which is not correct, but will be constant in the vicinity of the saturation, which is correct, and hence one can decide between the two points.

It is believed that the advantages of the invention have been explained in the foregoing disclosure, but to summarize a key point, the invention is important because otherwise saturation can never be estimated from attenuation in a physically meaningful way. That is, the interpretation will be biased by the choice of heterogeneity length scale. The invention estimates this length scale in addition to the saturation. Given multiple frequency data points, it is also possible to define the likely spatial distribution of the pore fluids, e.g. whether it is stratified or fractal, using the invention. The previously described patent publication by Hawthorne et al. primarily seeks fluid type rather than average saturation, and does not seek to identify length scale or spatial distributions of fluid. Tserkovank and Johnson (2001) do not employ asymptotic behavior of a rock physics model. Unlike the present invention, they do not solve for fluid saturation along with other fluid distribution parameters (spatial distribution, length scale and average saturation).

The foregoing patent application is directed to particular embodiments of the present invention for the purpose of illustrating it. It will be apparent, however, to one skilled in the art, that many modifications and variations to the embodiments described herein are possible. For example, the invention is described mostly in terms of seismic attenuation and geophysical acquisition geometry of a land or marine survey. Seismic waves have a limited frequency bandwidth generally about 13-30 Hz. The method could alternatively be applied to any compressional wave (P-wave) attenuation measured or extracted from, for example, borehole, vertical seismic profile ("VSP"), or cross-well tomography, i.e. different frequency bandwidths and acquisition geometries. All such modifications and variations are intended to be within the scope of the present invention, as defined in the appended claims. Persons skilled in the art will readily recognize that in practical applications of the invention, at least some of the steps in the present inventive method are performed on or with the aid of a computer, i.e. the invention is computer implemented.

REFERENCES

Brie, A., Pampuri, F., Marsala, A. F. and Meazza, O., "Shear sonic interpretation in gas bearing sands," SPE 30595, *Society of Petroleum Engineers Annual Technical Conference and Exhibition, Dallas*, (1995).

Cadoret, T., Marion, D. and Zinszner, B., "Influence of frequency and fluid distribution on elastic wave velocities in partially saturated limestones," *J. of Geophysical Research* 100, 9789-9803 (1995).

Cadoret, Mavko, and Zinszner, "I Fluid distribution effect on sonic attenuation in partially saturated limestones," *Geophysics* 63, 154-160 (1998).

Galvin, R. J., Toms, J. and Gurevich, B., "A simple approximation for seismic attenuation and dispersion in a fluid-saturated porous rock with aligned fractures," *SEG Expanded Abstracts* 26, 1679 (2007).

Gassmann, F., "Elastic waves through a packing of spheres," *Geophysics* 16, 673-685 (1951).

Gist, G. A., "Interpreting laboratory velocity measurements in partially gas-saturated rocks," *Geophysics* 59, 1100-1109 (1994)."

Gurevich, B. and Lopatnikov, S. L., "Velocity and attenuation of elastic waves in finely layered porous rocks," *Geophysical J. Int'l.* 121, 933-947 (1995).

Hill, R., "Elastic properties of reinforced solids: some theoretical principles," *J. of the Mechanics and Physics of Solids* 11, 357-372 (1963).

Johnson, D. L., "Theory of frequency-dependent acoustics in patchy-saturated porous media," *J.l of the Acoustical Society of America* 110, 682-694 (2001).

Müller, T. M. and Gurevich, B., "One-dimensional random patchy saturation model for velocity and attenuation in porous rocks," *Geophysics* 69, pp. 1166-1172 (2004).

Müller, T. M., Toms-Stewart, J., and Wenzlau, F., "Velocity-saturation relation for partially saturated rocks with fractal pore fluid distribution," *Geophysical Research Letters* 35, L09306 (2008).

Pride, S. R., Berryman, J. G. and Harris, J. M., "Seismic attenuation due to wave-induced flow," *J. of Geophysical Research* 109, No. B1, B01201 (2004).

Toms, J., Müller, T. M., Ciz, R. and Gurevich, B., "Comparative review of theoretical models for elastic wave attenuation and dispersion in partially saturated rocks," *Soil Dynamics and Earthquake Engineering* 26, 548-565 (2006).

Toms, J., Müller, T. M. and Gurevich, B., "Seismic attenuation in porous rocks with random patchy saturation," *Geophysical Prospecting* 55, 671-678 (2007).

Toms-Stewart, J., Müller, T. M., Gurevich, B., and Paterson, L., "Statistical characterization of gas patch distributions in partially saturated rocks," *Geophysics* 74, WA51-WA64 (2009).

Tserkovnyak, Y. and Johnson, D. L, "Can one hear the shape of a saturation patch," *Geophysical Research Letters* 29, 1108-1112 (2002).

White, J. E., "Computed seismic speeds and attenuation in rocks with partial gas saturation," *Geophysics* 40, 224-232 (1975).

White, J. E., Mikhaylova, N. G. and Lyakhovitskiy, F. M., 'Low-frequency seismic waves in fluid-saturated layered rocks," *Physics of the Solid Earth* (Transl. Izv.) 11, 654-659 (1976).

The invention claimed is:

1. A computer implemented method for estimating fluid heterogeneity in a subsurface region from compressional wave attenuation or velocity dispersion, comprising:
   measuring compressional wave attenuation or velocity, or extracting it from geophysical data, for at least one frequency;
   selecting a frequency-dependent, mathematical rock physics model for attenuation or velocity, said model pertaining to or containing one or more model parameters that pertain to heterogeneous features of fluid distribution in the subsurface region;
   using the rock physics model to predict frequency dependence of compressional wave attenuation or velocity; and
   using the predicted frequency dependence, the attenuation or velocity measured or determined from the geophysical data for at least one frequency, and measured or estimated rock and fluid properties of the subsurface region, called subsurface properties, to determine, using a computer, at least one unknown subsurface property, including fluid saturation, that is related to fluid heterogeneity, each such subsurface property corresponding to a parameter in the mathematical rock physics model.

2. The method of claim 1, wherein the rock physics model is for a selected type of spatial distribution of fluids and includes at least the following parameters:
   a characteristic length for fluid patches in the heterogeneous distribution, sometimes referred to as "heterogeneity length scale"; and
   relative percentage of each of two or more fluids, this being the fluid saturation parameter.

3. The method of claim 2, wherein the using the rock physics model to predict the frequency dependence comprises determining at least two asymptotes in the rock physics model's frequency-dependent behavior.

4. The method of claim 3, wherein a high-frequency asymptote and a low-frequency asymptote are determined, and then used in the determining of at least one unknown subsurface property related to fluid heterogeneity.

5. The method of claim 2, wherein the two or more fluids are brine and hydrocarbons.

6. The method of claim 2, wherein the selected type of spatial distribution of fluids is random, periodic, regularly layered, random layered or other type of distribution, and the selection is made, at least partly, according to which type better fits the measured or extracted attenuation or velocity values or their asymptotic behavior, where the fit is assessed by visual comparison or through a mathematical fitting routine having a confidence interval defined by a mathematical function that describes the difference in the attenuation or velocity predicted by the rock physics model and the measured or extracted attenuation or velocity.

7. The method of claim 1, wherein the method is applied both to compressional wave attenuation measurements and to compressional wave velocity measurements, using the same rock physics model to analyze each, followed by combining results of each application to determine the at least one unknown subsurface property related to fluid heterogeneity.

8. The method of claim 1, wherein the geophysical data comprise at least one of seismic data, cross well tomography, vertical seismic profile data, sonic logs, and laboratory measurements on core plugs.

9. The method of claim 1, wherein the measured or estimated rock and fluid properties of the subsurface region are selected from a list comprising porosity, permeability, grain density, grain bulk and shear moduli, dry rock frame bulk and shear moduli, fluid bulk modulus, fluid viscosity, and fluid density.

10. The method of claim 4, wherein using the predicted frequency dependence, the attenuation or velocity measured or determined from the geophysical data for at least one frequency, and measured or estimated rock and fluid properties of the subsurface region, called subsurface properties, to determine at least one unknown subsurface property, including fluid saturation, that is related to fluid heterogeneity comprises:
    inverting said asymptotes for said at least one unknown subsurface property as a function of either attenuation or velocity, and frequency.

11. The method of claim 10, wherein two model parameters corresponding to two unknown subsurface properties related to fluid heterogeneity are determined by steps comprising:
    plotting the two inverted asymptotes on a cross-plot wherein the two model parameters are plotted versus each other for input data comprising the attenuation or velocity value or values and corresponding frequency or frequencies measured or extracted from geophysical data, and recording their intersection point coordinates as the determined values of the two unknown subsurface properties related to fluid heterogeneity.

12. The method of claim 11, wherein the input data are extracted from geophysical data that are selected such that (i) the attenuation peaks at a frequency within and preferably centered in the geophysical data's bandwidth, or (ii) a corresponding shift in velocity versus frequency occurs at a frequency within and preferably centered in the geophysical data's bandwidth.

13. The method of claim 12, wherein determination of where the peak frequency for attenuation or mid-shift frequency for velocity is relative to the input data's frequencies is made by plotting the two asymptotes on a plot of attenuation or velocity vs. one of the two model parameters for one of the input data's frequencies, then repeating the plot for other input data frequencies, identifying whether the input data frequency is located on the high-frequency asymptote or the low-frequency asymptote according to which curve is flatter.

14. The method of claim 12, wherein the two model parameters, as well as the two unknown subsurface properties related to fluid heterogeneity, are heterogeneity length scale and fluid saturation, and wherein determination of where the peak frequency for attenuation or mid-shift frequency for velocity is relative to the input data's frequencies comprises:
    substituting heterogeneity length scale and fluid saturation relationships determined from the inverted asymptotes into the rock physics model along with the input data's frequencies, resulting in substituted relationships, one corresponding to each asymptote, that relate attenuation to fluid saturation or attenuation to heterogeneity length scale;
    using the substituted relationships to cross-plot predicted attenuation or velocity versus at least one of the two model parameters, for each asymptote; and
    examining said cross-plots for constant attenuation or constant velocity behavior, and associating constant attenuation or velocity behavior with location of the peak frequency for attenuation relative to the input data's frequencies.

15. The method of claim 14, wherein an intersection of the cross-plot for the high-frequency asymptote with the cross-plot for the low-frequency asymptote is an estimate of the model parameter's value in the subsurface region.

16. The method of claim 14, further comprising generating a plurality of the cross-plots, each for a different frequency asymptote relationship, and:
   upon a finding that the cross-plot for the low-frequency asymptote for a certain frequency exhibits flat behavior, concluding that that frequency is below the peak frequency;
   upon a finding that the cross-plot for the high-frequency asymptote for a certain frequency exhibits flat behavior, concluding that that frequency is above the peak frequency; and
   upon a finding that for a certain frequency, neither the cross-plot for the high-frequency asymptote nor the cross-plot for the low-frequency asymptote exhibits flat behavior, concluding that that frequency is in the vicinity of the peak frequency.

17. The method of claim 12, further comprising using the peak frequency for attenuation or the mid-shift frequency for velocity together with the rock physics model to estimate permeability.

18. The method of claim 10, further comprising substituting the at least one unknown subsurface property, which was determined by inverting asymptotes, back into the rock physics model to predict attenuation or velocity as a function of frequency, and then solving for an update to the rock physics model based at least partly on an improved fit of model-predicted attenuation or velocity to the attenuation or velocity measured or determined from the geophysical data for at least one frequency.

19. The method of claim 18, wherein the substituting is performed using a mathematical fitting routine.

20. The method of claim 2, wherein the heterogeneity length scale is derived from a correlation function that is assumed to describe the fluid heterogeneity in the subsurface region, said correlation function being a continuous smooth function, or a discrete function, that describes how two points are correlated in terms of their separation distance.

21. The method of claim 20, wherein the correlation function is given by one of an exponential function, a Gaussian function, and a von Karman function.

22. The method of claim 2, wherein the heterogeneity length scale is derived from a linear path function that is assumed to give a probability of different-sized fluid heterogeneities in the subsurface region.

23. The method of claim 2, wherein the spatial distribution of fluid heterogeneities is characterized by layered geometry, and the heterogeneity length scale is described by a mean layer width or width of a selected layer.

24. The method of claim 2, wherein the fluid heterogeneity in the subsurface region is defined by inclusion shape, and the heterogeneity length scale is described by radius or axis length or another parameter of the inclusion shape.

25. A computer-implemented method comprising:
   quantifying changes in P-wave velocity or attenuation utilizing assumed rock physics relationships; and
   estimating saturation heterogeneities, including production-induced changes in hydrocarbon fluid saturation and corresponding heterogeneous spatial distribution of residual hydrocarbons based on the changes in P-wave velocity or attenuation,
   wherein the assumed rock physics relationships are used, by a computer, to predict expected behavior of P-wave attenuation or velocity as a function of frequency, then using the predicted behavior along with measurements of the P-wave attenuation or velocity at one or more frequencies and assumptions of reservoir conditions including temperature, pressure and subsurface properties including rock and fluid type, and elastic properties, to constrain type of spatial distribution, length scale of the saturation heterogeneities, and fluid saturation.

26. The method of claim 25, wherein the saturation heterogeneities are smaller than the P-wave wavelength.

27. A computer-implemented method comprising:
   quantifying changes in P-wave velocity or attenuation utilizing assumed rock physics relationships;
   estimating saturation heterogeneities, including production-induced changes in hydrocarbon fluid saturation and corresponding heterogeneous spatial distribution of residual hydrocarbons based on the changes in P-wave velocity or attenuation;
   measuring P-wave attenuation or velocity, or extracting it from geophysical data acquired from a subsurface region, for at least one frequency;
   selecting a frequency-dependent, mathematical rock physics model for attenuation or velocity, said model pertaining to or containing one or more model parameters that pertain to heterogeneous features of fluid distribution in the subsurface region;
   using the rock physics model to predict frequency dependence of P-wave attenuation or velocity; and
   using the predicted frequency dependence, the measured or extracted attenuation or velocity for the at least one frequency, and measured or estimated rock and fluid properties of the subsurface region, called subsurface properties, to determine, using a computer, at least one unknown subsurface property, including fluid saturation, that is related to fluid heterogeneity, each such subsurface property corresponding to a parameter in the mathematical rock physics model.

28. A method for producing hydrocarbons from a new or producing field, comprising:
   applying a method of claim 1 to determine subsurface fluid heterogeneities;
   identifying the heterogeneities as patches of hydrocarbons;
   utilizing knowledge of the fluid heterogeneities in developing a new production or development plan or revising an existing production or development plan for the field; and
   producing hydrocarbons under the new or revised production or development plan.

29. A computer-implemented method for simultaneously estimating fluid saturation and heterogeneity length scale for a heterogeneous spatial distribution of fluids in a subsurface region from compressional wave attenuation or velocity dispersion, said method comprising:
   from a mathematical rock physics model having parameters including at least fluid saturation and heterogeneity length scale, forming mathematical relationships that describe asymptotic frequency dependency of attenuation or velocity;
   on a computer, inverting the mathematical relationships using attenuation or velocity values measured at at least one frequency, to obtain mathematical expressions corresponding to each of a high-frequency and a low-frequency asymptote, which mathematical expressions, called inverted asymptotes, relate fluid saturation to heterogeneity length scale;
   estimating fluid saturation and heterogeneity length scale from an intersection of plots of the inverted asymptotes.

* * * * *